(12) United States Patent
Dame et al.

(10) Patent No.: US 10,878,709 B2
(45) Date of Patent: Dec. 29, 2020

(54) SYSTEM, METHOD, AND COMPUTER READABLE MEDIUM FOR AUTONOMOUS AIRPORT RUNWAY NAVIGATION

(71) Applicant: The Boeing Company, Chicago, IL (US)

(72) Inventors: Stephen Dame, Chicago, IL (US); Dragos D. Margineantu, Chicago, IL (US); Nick S. Evans, Chicago, IL (US); Tyler C. Staudinger, Chicago, IL (US); Brian K. Rupnik, Lake Stevens, WA (US); Matthew A. Moser, Everett, WA (US); Kevin S. Callahan, Chicago, IL (US); Brian T. Whitehead, Chicago, IL (US)

(73) Assignee: The Boeing Company, Chicago, IL (US)

(*) Notice: Subject to any disclaimer, the term of this patent is extended or adjusted under 35 U.S.C. 154(b) by 172 days.

(21) Appl. No.: 16/039,490

(22) Filed: Jul. 19, 2018

(65) Prior Publication Data
US 2020/0027362 A1     Jan. 23, 2020

(51) Int. Cl.
*G08G 5/06*     (2006.01)
*G01C 21/20*     (2006.01)
(Continued)

(52) U.S. Cl.
CPC ............. *G08G 5/065* (2013.01); *G01C 21/20* (2013.01); *G01C 23/00* (2013.01); *G05D 1/0038* (2013.01);
(Continued)

(58) Field of Classification Search
CPC ........ G08G 5/065; G01C 21/20; G01C 23/00; G05D 1/0038; G05D 1/0083; G05D 1/0202; G06K 9/00624; H04N 7/18
See application file for complete search history.

(56) References Cited

U.S. PATENT DOCUMENTS

| 7,382,284 B1 * | 6/2008 | Armstrong | G08G 5/0021 |
| | | | 340/958 |
| 9,594,372 B1 * | 3/2017 | Sills | A61H 3/06 |

(Continued)

FOREIGN PATENT DOCUMENTS

EP     0 980 828     2/2000

OTHER PUBLICATIONS

Dwivedi, Priya, "Tracking a Self-Driving Car With High Precision," Towards Data Science, Chapter 6: Doing cool things with data!, https://towardsdatascience.com/helping-a-self-driving-car-localize-itself-88705f419e4a, 6 pages.

(Continued)

*Primary Examiner* — Aaron L Troost
(74) *Attorney, Agent, or Firm* — McDonnell Boehnen Hulbert & Berghoff LLP

(57) ABSTRACT

Example implementations relate to autonomous airport runway navigation. An example system includes a first sensor and a second sensor coupled to an aircraft at a first location and a second location, respectively, and a computing system configured to receive sensor data from one or both of the first sensor and the second sensor to detect airport markings positioned proximate a runway. The computing system is further configured to identify a centerline of the runway based on the airport markings and receive sensor data from both of the first sensor and the second sensor to determine a lateral displacement that represents a distance between a reference point of the aircraft and the centerline of the runway. The computing system is further configured to control instructions that indicate adjustments for aligning the reference point of the aircraft with the centerline of the runway during subsequent navigation of the aircraft.

20 Claims, 14 Drawing Sheets

(51) Int. Cl.
  *G01C 23/00*  (2006.01)
  *G05D 1/00*  (2006.01)
  *G05D 1/02*  (2020.01)
  *G06K 9/00*  (2006.01)
  *H04N 7/18*  (2006.01)
(52) U.S. Cl.
  CPC ......... *G05D 1/0083* (2013.01); *G05D 1/0202* (2013.01); *G06K 9/00624* (2013.01); *H04N 7/18* (2013.01)

(56) References Cited

U.S. PATENT DOCUMENTS

| | | | |
|---|---|---|---|
| 2004/0056942 A1* | 3/2004 | Kobayashi | B41J 2/385 347/111 |
| 2004/0056952 A1 | 3/2004 | Konya | |
| 2008/0177427 A1 | 7/2008 | Marty et al. | |
| 2013/0138273 A1* | 5/2013 | Koukol | G08G 5/0021 701/15 |
| 2014/0197168 A1* | 7/2014 | Miller | B65D 19/18 220/4.33 |
| 2014/0297168 A1 | 10/2014 | Ovens et al. | |
| 2015/0332098 A1* | 11/2015 | Wang | G06K 9/3241 382/103 |
| 2018/0091797 A1* | 3/2018 | Armatorio | G08G 5/0078 |

OTHER PUBLICATIONS

Extended European Search Report prepared by the European Patent Office in application No. EP 19 185 433.0 dated Dec. 16, 2019.

* cited by examiner

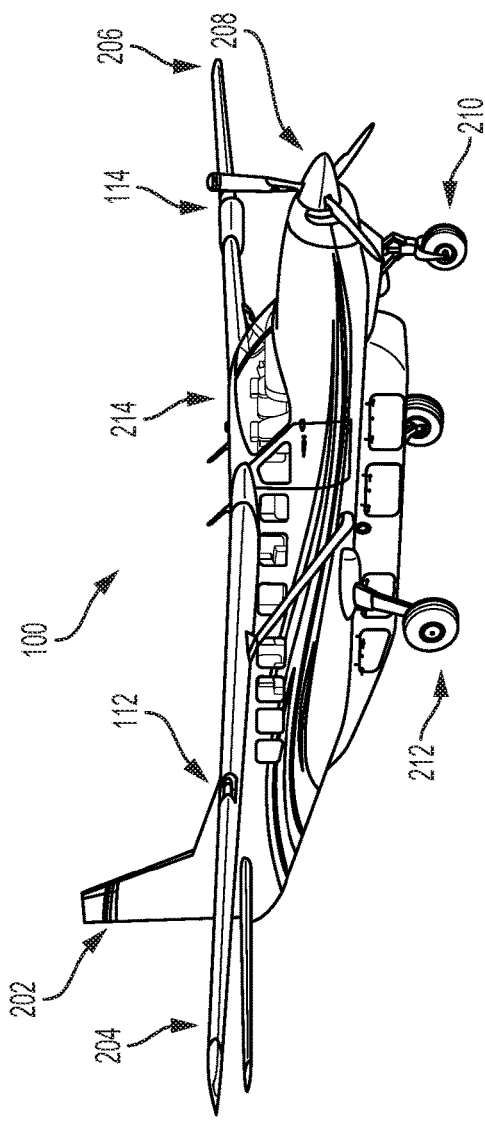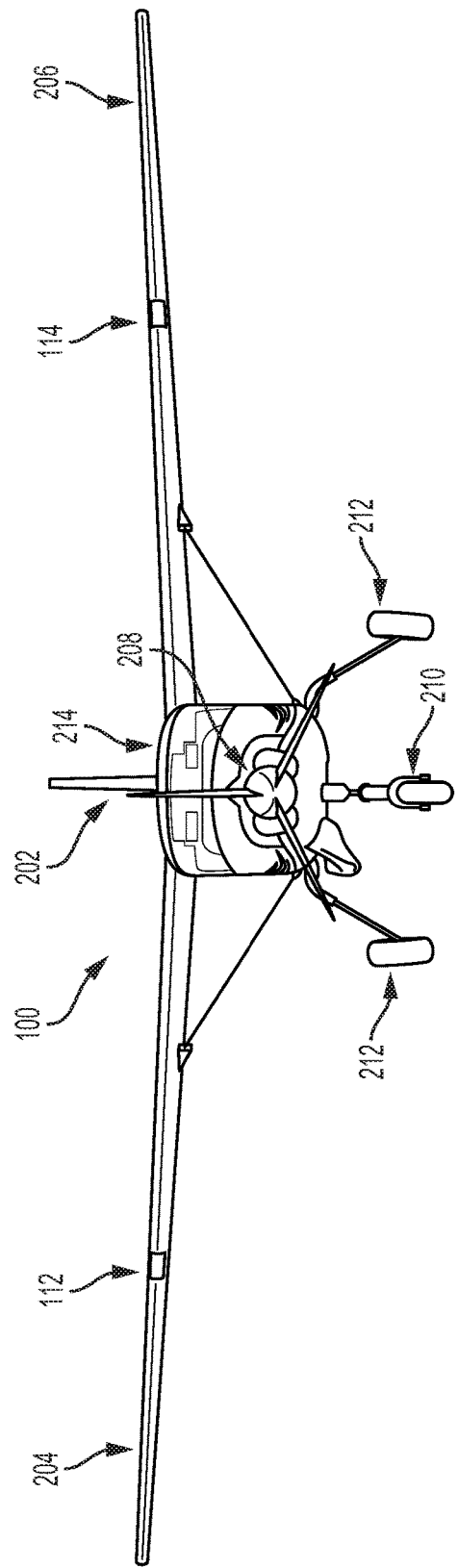

SYSTEM, METHOD, AND COMPUTER READABLE MEDIUM FOR AUTONOMOUS AIRPORT RUNWAY NAVIGATION

FIELD

The present disclosure relates generally to an airport ground path and runway detection system, and more particularly to, examples for autonomous navigation of an aircraft on airport ground paths and runways.

BACKGROUND

An airport is a complex that typically includes buildings and a series of ground paths and runways that can enable aircrafts to navigate between the buildings to accommodate passengers before performing a takeoff or after completing a landing. Various types of aircrafts are often located at the airport with some aircrafts docked to load passengers while others are using runways for initiating a flight or for performing a landing. Due to the high volume of aircrafts at an airport at any given time and the high speeds aircrafts travel upon runways during a landing or after a takeoff, it is important that aircrafts are controlled safely while navigating the different ground paths, taxiways, and runways.

During ground navigation at an airport, an aircraft is typically controlled by a pilot who can rely upon airport markings for guidance. Airport markings, such as signs positioned nearby ground paths and the variety of surface lines and markings painted upon the runways, taxiways, and ground paths, provide directions and instructions that can help a pilot determine an appropriate route and speeds to navigate an aircraft. For example, a pilot can follow airport markings, including centerlines and boundaries positioned on paths and runways when navigating a docked aircraft from a passenger boarding bridge to a runway to prepare and execute a takeoff.

SUMMARY

In one example, a system is described. The system includes a first sensor coupled to an aircraft at a first location, a second sensor coupled to the aircraft at a second location, and a computing system. The computing system is configured to receive a first set of sensor data that includes sensor data from one or both of the first sensor and the second sensor and detect one or more airport markings positioned proximate a runway using the first set of sensor data. The aircraft is positioned on the runway. The computing system is further configured to identify a centerline of the runway based on the one or more airport markings and receive a second set of sensor data that includes sensor data from both of the first sensor and the second sensor. The computing system is also configured to determine a lateral displacement that represents a distance between a reference point of the aircraft and the centerline of the runway using the second set of sensor data. The lateral displacement is determined based on a comparison of a first position of the reference point relative to the centerline of the runway as represented in sensor data from the first sensor with a second position of the reference point relative to the centerline of the runway as represented in sensor data from the second sensor. The computing system is also configured to provide control instructions that indicate one or more adjustments for aligning the reference point of the aircraft with the centerline of the runway during subsequent navigation of the aircraft.

In another example, a method is described. The method includes receiving, at a computing system, a first set of sensor data. The first set of sensor data includes sensor data from one or both of a first sensor coupled to an aircraft at a first location and a second sensor coupled to the aircraft at a second location. The method also includes detecting, by the computing system, one or more airport markings positioned proximate a runway using the first set of sensor data. The aircraft is positioned on the runway. The method includes identifying a centerline of the runway based on the one or more airport markings and receiving, at the computing system, a second set of sensor data. The second set of sensor data includes sensor data from both of the first sensor and the second sensor. The method also includes determining, by the computing system, a lateral displacement that represents a distance between a reference point of the aircraft and the centerline of the runway using the second set of sensor data. The lateral displacement is determined based on a comparison of a first position of the reference point of the aircraft relative to the centerline of the runway as represented in sensor data from the first sensor with a second position of the reference point of the aircraft relative to the centerline of the runway as represented in sensor data from the second sensor. The method further includes providing, by the computing system, control instructions that indicate one or more adjustments for aligning the reference point of the aircraft with the centerline of the runway during subsequent navigation of the aircraft.

In a further example, a non-transitory computer-readable medium is described. The non-transitory computer-readable medium is configured to store instructions, that when executed by a computing system, causes the computing system to perform operations. The operations include receiving a first set of sensor data. The first set of sensor data includes sensor data from one or both of a first sensor coupled to an aircraft at a first location and a second sensor coupled to the aircraft at a second location. The operations also include detecting one or more airport markings positioned proximate a runway using the first set of sensor data. The aircraft is positioned on the runway. The operations include identifying a centerline of the runway based on the one or more airport markings and receiving a second set of sensor data. The second set of sensor data includes sensor data from both of the first sensor and the second sensor. The operations include determining a lateral displacement that represents a distance between a reference point of the aircraft and the centerline of the runway using the second set of sensor data. The lateral displacement is determined based on a comparison of a first position of the reference point of the aircraft relative to the centerline of the runway as represented in sensor data from the first sensor with a second position of the reference point of the aircraft relative to the centerline of the runway as represented in sensor data from the second sensor. The operations also include providing control instructions that indicate one or more adjustments for aligning the reference point of the aircraft with the centerline of the runway during subsequent navigation of the aircraft.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 2 illustrates the system coupled to an aircraft, according to an example implementation.

FIG. 3 illustrates another view of the system coupled to the aircraft, according to an example implementation.

DETAILED DESCRIPTION

Figure 1:
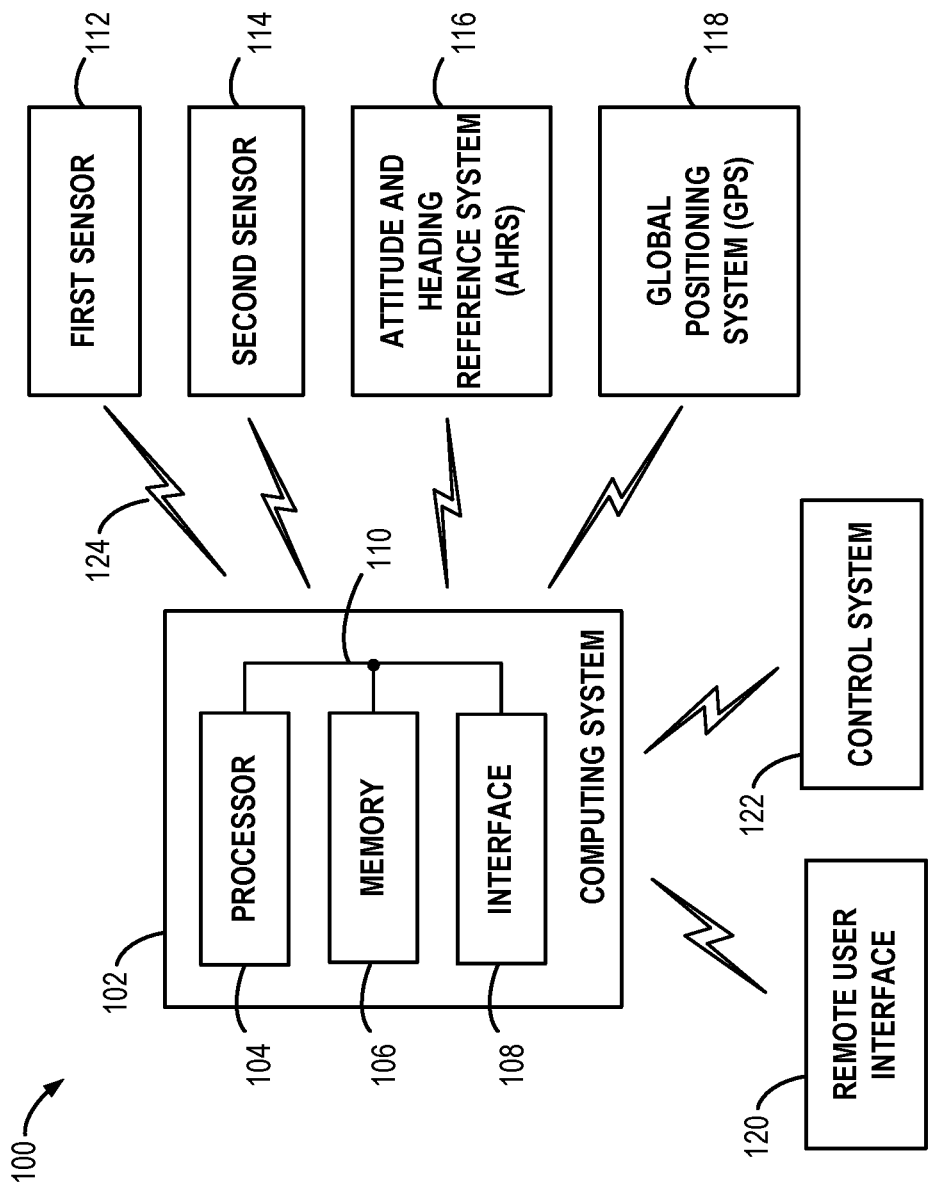
FIG. 1 is a block diagram depicting a system, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Ground navigation of an aircraft at an airport or similar setting typically involves a pilot controlling the aircraft using guidance from airport markings, such as signs and various surface lines painted along available ground paths, taxiways, and runways. The pilot can observe and control the aircraft based on signs, path boundaries, and surface markings positioned on or along the ground paths while also identifying potential obstacles (e.g., other aircrafts, vehicles, and people) in the environment of the aircraft. The variety of signs and other airport markings can serve as waypoints that help the pilot identify the overall position of the aircraft within the general context of the airport. For instance, the pilot can determine that the aircraft on a path navigating towards building to drop of passengers or near a particular runway based on the information provided by signs and other airport markings. Thus, although a pilot can skillfully and safely navigate an aircraft between flights on the ground, the ground navigation of the aircraft relies upon the skills and decisions provided by the pilot observing the surrounding environment.

Example implementations presented herein describe systems, methods, and computer readable medium for autonomous airport runway navigation, such as autonomous operation of an aircraft on the runway. Some examples involve developing and providing information to a pilot controlling an aircraft on the ground at an airport or a similar environment in a manner that can assist the pilot with ground navigation. For instance, the system can include sensors configured to obtain sensor data representing a forward environment of the aircraft and a computing system that processes the sensor data to develop and provide the sensor data in a format that can assist the pilot. In some instances, the system can use sensor data to form control instructions that include adjustments for centering the aircraft along a desired path during subsequent navigation. For example, the control instructions can specify adjustments that modify the orientation of the aircraft to align the aircraft with a center of a path (e.g., the centerline of a runway).

Some examples involve using sensor data to develop control instructions that can enable the aircraft to be navigated in a semi-autonomous or fully autonomous mode. When the control instructions enable semi-autonomous operation of the aircraft during ground navigation, the system can be configured to enable the pilot to maintain control of some aspects of the navigation while the control instructions cause systems of the aircraft to carry out other control operations. For example, the control instructions can adjust the orientation of the aircraft during ground navigation to remain center upon a ground path to avoid navigating off the path while enabling the pilot to control the speed, braking, and other controls.

When the control instructions enable the fully autonomous mode during ground navigation, systems of the aircraft can use control instructions developed by the system to safely navigate the aircraft without input from a pilot. The system can be configured to detect runways and paths and further cause the aircraft to navigate according to airport markings while operating in the fully autonomous mode. As such, in both the semi-autonomous and fully autonomous modes of ground navigation of an aircraft, the system can be configured to enable a pilot to assume control and overrule automated controls of the aircraft.

In order to detect desired paths and understand the environment, an example system can capture sensor data of airport markings and objects in the path of navigation of the aircraft using a variety of sensors, such as cameras (e.g., thermal imaging cameras, RGB cameras), radar, light detection and ranging (LIDAR), or a combination of different sensors. The types, positions, and quantities of sensors used can differ within examples. One or more sensors can be coupled to the aircraft at positions that enable measuring an area nearby the aircraft, such as a forward environment of the aircraft that includes the ground path that the aircraft is traveling upon. To illustrate an example layout, a system used for ground navigation of an aircraft can include a first sensor coupled on a first wing of the aircraft and a second sensor coupled on a second wing of the aircraft. In the example layout, both sensors can be oriented to measure a forward path of the aircraft to enable a computing system within the system to perform computer vision processing upon obtained sensor in order to estimate positions of objects, people, and airport markings (e.g., signs, surface lines) relative to the aircraft.

Sensors can be arranged in various ways to obtain sensor data of a particular area of the environment of the aircraft. For example, one or more sensors can have a forward orientation in order to measure the ground path and general environment positioned ahead of the aircraft. These forward-facing sensor or sensors can be configured to capture sensor measurements that include a portion of the aircraft to be used as a reference point. In particular, a computing system processing the sensor measurements can use the portion of the aircraft as a reference point (e.g., the front wheel of the aircraft) when analyzing sensor data to estimate the positions of objects (e.g., aircrafts, vehicles), people, and airport markings relative to the aircraft.

The computing system can then use the estimated positions of objects and airport markings, etc., when determining control instructions for subsequent ground navigation of the aircraft. For instance, one or more cameras coupled to the wings or other locations of an aircraft (e.g., body of the aircraft) can provide images that include the nose and/or the front wheel of the aircraft along with the surrounding area. The computing system processing the images can then use the nose or the front wheel as a reference point when determining subsequent control instructions for navigating the aircraft along a ground path (e.g., instructions that align the nose or front wheel with a center of a ground path).

When initially formulating control instructions, the computing system can receive and use sensor data to gain a general understanding of the environment of the aircraft. In particular, the computing system uses sensor data to detect nearby airport markings, such signs, surface lines, changes in the material making up paths (e.g., concrete and grass boundaries), intersections between multiple paths (e.g., an intersection that exists between two runways), objects (e.g., aircrafts, vehicles), and people in the environment of the aircraft. The computing system can then use the surface markings to determine a path to navigate while also performing obstacle avoidance based on sensor data. For instance, the computing system can detect and identify a runway and the corresponding centerline of the runway using airport markings detected within sensor data. In some examples, the computing system can use sensor data from one or more sensors to detect and identify path edge geometry (e.g., the edge geometry of a runway) to define bounds of the path if there are no markings visible (e.g., rubbed off markings, blank parts of the path, challenging lighting conditions).

In addition, the sensor data measuring airport markings can enables a computing system to use the sensor data to determine a location of the aircraft within the general context of the airport. The computing system can use computer vision or other sensor data processing techniques to detect, identify, and use signs and other airport markings as waypoints in a manner similar to a pilot. For example, the computing system can use identified signs and airport markings to that the aircraft is located nearby a building or runways at the airport. The computing system can also detect and define boundaries of a path that the aircraft can use during subsequent ground navigation.

In some examples, the computing system can compare airport markings detected and identified using sensor data with one or more maps representing the layout of the airport to determine a position of the aircraft. A map can indicate the position of runways, taxiways, and other ground paths relative to buildings at the airport. As such, the computing system can use incoming sensor data to determine a general position of the aircraft within the context of the layout of the airport by comparing airport markings within a map. The map and sensor data can serve to supplement each other during processing and analysis by the computing system.

In some examples, the system can use localization techniques (e.g., a best fit localization) to align images received from one or more sensors to a map of the airport. The computing system can further perform object detection and localization while also updating the map of the airport. While operating and using the map and incoming sensor data, the computing system can further plan the ground path of the aircraft and also develop and execute control instruction for navigating according to planned ground path.

The system can use sensor measurements to further refine navigation of a path of travel. For instance, after detecting and identifying a center of a path for navigating the aircraft (e.g., the centerline of a runway), the computing system can use additional sensor data from sensors to determine navigation instructions that represent how to navigate the aircraft during subsequent ground navigation. In particular, the computing system can use sensor data to determine control instructions that cause the aircraft to navigate along a center of a target path, such as the centerline of the runway.

The computing system can use sensor data to determine a lateral displacement that represents a distance between a reference point (e.g., the front wheel or nose) of the aircraft and the center of a target path (e.g., the centerline of the runway). The lateral displacement represents the offset of the aircraft (or a reference point of the aircraft) at a current position and orientation relative to the centerline of the runway. The computing system can use the lateral displacement to formulate control instructions that align the reference point of the aircraft with the centerline or estimated center of the path upon which the aircraft is traveling. In some examples, the computing system can use sensor data from one or more sensors to also determine a heading of the aircraft with respect to a centerline of a target path of travel. The computing system can use a combination of the lateral displacement and the heading of the aircraft when determining control instructions for subsequent navigation of the aircraft.

In some examples, the computing system can further use additional sensor data from other sensors when assisting with ground navigation of an aircraft. For instance, the computing system can use the additional sensor data when determining the lateral displacement between a reference point of the aircraft and a target path of travel. The computing system can receive trend information that represents one or more prior movements performed by the aircraft from one or both of an attitude and heading reference system (AHRS) and a global positioning system (GPS). The AHRS and the GPS can be positioned on the aircraft and measure recent movements of the aircraft.

The computing system within the system can receive and use trend information to estimate a future position and orientation of the aircraft. For example, if the aircraft is traveling slightly away from the center of a path (e.g., the centerline of a runway) as indicated within trend information, the computing system can estimate that the aircraft will continue to navigate away from the centerline unless adjustments are applied to controls of the aircraft. As such, the computing system can use trend information and estimated future positions and orientations of the aircraft when determining the lateral displacement between a reference point of the aircraft and the desired path (e.g., the centerline of the runway). The computing system can use the orientation, position, speed, acceleration, and other factors (e.g., speed of the wind in the environment, slope of the path) when determining the lateral displacement of a reference point of the aircraft relative to a target path of ground travel.

In some examples, the computing system is configured to detect any noise that can arise within sensor data received from the sensors coupled to the aircraft. Noise within sensor data can signal to the computing system that the sensor data is potentially unreliable. For example, the noise can arise from environment conditions (e.g., rain, wind), poor lighting conditions, and/or as a result during capture by a sensor. As a result of detecting noise in the sensor data, the computing system can be configured to perform additional actions to overcome the presence of noise. For instance, the computing system can be configured to use trend information when determining the lateral displacement that represents the distance between a reference point of the aircraft and a desired path (e.g., the centerline of a runway). In addition, the computing system can be configured to obtain additional sensor data to increase confidence within estimations made using sensor data.

The computing system can also be configured to detect gaps in the centerline of the runway or other surface lines used for guidance of the aircraft. A gap can correspond to a break in a surface line or absence of the surface line in some areas resulting in spacing between sections or portions of the surface line. For example, when the computing system is relying upon images from cameras coupled to the aircraft, the images can show gaps in the centerline of the runway or other type of surface line that can make determining the lateral displacement between the reference point of the aircraft and the surface line difficult at the gaps. In such a situation, the computing system can use trend information to determine the lateral displacement from a desired path when determining navigation instructions. Further, the computing system can also be configured to not provide additional adjustments that alter the orientation of the aircraft until receiving additional sensor data that reestablishes the presence of the surface line used for guidance of the aircraft. In some instances, gaps can arise in a surface line due to dirt or other materials blocking the visibility of the surface line.

As indicated above, the computing system can determine control instructions that cause a reference point of the aircraft to align with a target path (e.g., the centerline of a runway) during subsequent navigation. In some instances, execution of the control instructions can cause a gradual adjustment of the position and orientation of the aircraft towards the centerline until the reference point of the aircraft is navigating upon the centerline of the runway. The gradual adjustment can prevent unwanted shifts that can bother passengers aboard the aircraft or dislodge and shift cargo carried by the aircraft. In other instances, execution of the control instructions can cause the reference point of the aircraft to quickly align with the centerline of the runway. As such, the amount of time required to align the reference point of the aircraft with a target path (e.g., the centerline of a runway) can depend on the size of the lateral displacement, the ground speed of the aircraft, the orientation of the aircraft, and the size of the aircraft, among other factors.

The system can be configured to provide sensor measurements and/or control instructions to a remotely positioned computing device, such as a control system of the aircraft or a remote user interface. For example, a remote user interface receiving sensor measurements or control instructions from the system can include a head mountable display configured to display the information received from the system. In other examples, the remote user interface can have another configuration. As such, the remote user interface can receive control instructions and other information from the system that can be used as a training platform to simulate or train a pilot to control an aircraft on the ground. In further examples, the remotely positioned computing device receiving control instructions and other information from the system can be used to remotely control the aircraft during ground navigation.

In additional examples, the computing system can also use a primary sensor to determine control instructions and one or more secondary sensors to confirm or modify the measurements captured by the primary sensor.

Referring now to the Figures, FIG. 1 is a block diagram depicting a system 100, according to an example implementation. The system 100 represents an example navigation system configured to assist with ground navigation of an aircraft. For example, the system 100 can enable fully autonomous or semi-autonomous ground navigation of the aircraft by obtaining and processing sensor data representing the environment of the aircraft. Some components of the system 100 can be mounted on or provided on the aircraft while other components are remotely positioned (e.g., on the ground at the airport). In further examples, all components of the system 100 are coupled to or provided on the aircraft.

As shown in FIG. 1, the system 100 includes a computing system 102 participating in wireless communication 124 with a first sensor 112, a second sensor 114, an AHRS 116, a GPS 118, a remote user interface 120, and a control system 122. The different devices shown in the system 100 communicating with the computing system 102 are included for example purposes and can differ within other implementations. In addition, the computing system 102 can communicate with the various devices at different times. For instance, the computing system 102 can be configured to communicate with the remote user interface 120 in some instances and the control system 122 in other instances. Further, other implementations of systems for autonomous airport runway navigation can include more or fewer components in different arrangements. Additional configurations are described below.

The system 100 is an example navigation system that can assist with ground navigation of an aircraft. The degree of assistance provided by the system 100 can vary within example implementations. In order to assist ground navigation of an aircraft, the system 100 is configured to obtain and use sensor data to develop an understanding of the environment in a manner similar to a pilot. The system 100 can use sensor data to detect the layout of the environment, including detecting and identifying a desired ground path for the aircraft to travel upon. In addition, the system 100 can detect and identify airport markings (e.g., signs, surface lines) to determine a location of the aircraft within the context of the airport and to further plan a route for ground navigation. As such, the different detected airport markings can serve as waypoints that the system 100 can use for path planning and navigation.

The system 100 can further use sensor data to develop control instructions that can assist with ground navigation of the aircraft. For example, the system 100 can provide control instructions that indicate one or more adjustments for aligning a reference point of the aircraft with a center of a given ground path (e.g., a centerline of the runway) during subsequent navigation of the aircraft.

In some examples, the system 100 can serve as a supplement for a pilot controlling the aircraft during ground navigation. For instance, the system 100 can use sensor data to form and provide alerts to a pilot controlling the aircraft. The alerts can indicate the presence of a potential obstacle or can assist with maintaining a centered path of travel upon a ground path that the aircraft is situated upon. The system 100 can also be configured to provide sensor measurements for the pilot to view and use during ground navigation. In a further example, the system 100 controls the aircraft (or sends control instructions to the control system 122 of the aircraft) using sensor data and computer vision while a pilot remotely monitors the aircraft and the controls provided by the system 100.

Further, the system 100 can additionally determine and provide control instructions that indicate one or more adjustments for aligning a reference point of the aircraft with a desired path (e.g., a centerline of the runway) to the control system 122 for use by a pilot. In such a configuration, the system 100 can enable semi-autonomous operation of the aircraft allowing the pilot to control some aspects of the ground navigation of the aircraft while the system 100 controls other aspects. When the system 100 is serving as a semi-autonomous system that is configured to assist a pilot, the system 100 can be configured to allow the pilot to overrule any controls or control suggestions.

In further examples, the system 100 is configured to enable autonomous operation of the aircraft during ground navigation at an airport or a similar environment. For instance, the system 100 can use sensor data to form control instructions that are provided to control systems of the aircraft for execution in order to enable autonomous navigation. As such, the system 100 can provide the control instructions to the control system 122 for autonomous control the aircraft as further described in detail below.

The system 100 can also be configured to provide sensor measurements and control instructions to a remote user interface 120. For example, the system 100 can provide control instructions that indicate one or more adjustments for aligning a reference point of the aircraft with a desired path (e.g., a centerline of the runway) during subsequent navigation of the aircraft to the remote user interface 120. The remote user interface 120 can use input from the system 100 to train a pilot learning how to navigate an aircraft on the ground at the airport or can be used to enable a pilot to remotely control the aircraft.

Within the system 100, the computing system 102 represents a device capable of receiving and processing sensor data obtained by sensors of the system 100. For example, the computing system 102 can receive sensor data and perform a robust process that matches sensor fusion capabilities with vehicle dynamics in order to achieve a highly reliable means to control the aircraft by computer vision and remote monitoring.

The computing system 102 is also configured to communicate with other computing devices. In some examples, the computing system 102 can correspond to multiple computing devices. Further, the computing system 102 can be located on the aircraft or can be physically separate from the aircraft. As shown in FIG. 1, the computing system 102 includes a processor 104, a memory 106, and an interface 108, all of which can be coupled by a system bus 110 or a similar mechanism. In other examples, the computing system 102 can include other components.

The processor 104 can be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, the processor 104 can be one or more single-core processors. In other cases, the processor 104 can be one or more multi-core processors with multiple independent processing units. The processor 104 can also include register memory for temporarily storing instructions being executed and related data, as well as cache memory for temporarily storing recently-used instructions and data.

The memory 106 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, the memory 106 represents both main memory units, as well as long-term storage.

The memory 106 can store program instructions and/or data on which program instructions may operate. By way of example, the memory 106 can store these program instructions on a non-transitory, computer-readable medium, such that the instructions are executable by the processor 104 to carry out any of the methods, processes, or operations disclosed in this specification or the accompanying drawings.

In addition, the memory 106 can also receive and store maps. In some examples, the computing system 102 can receive maps of an airport or another environment from a database that stores the maps. The database can be associated with the airport in particular or with the system 100. Further, the computing system 102 can use the memory 106 to compare expected airport markings and layout of paths with the airport markings and layout of paths detected by the system 100 using sensor data. In further examples, the computing system 102 can develop a map using sensor data and store the map in the memory 106.

The interface 108 enables communication between the computing system 102 and other computing devices. For example, the interface 108 can establish wired or wireless communication 124 with the first sensor 112, the second sensor 114, the AHRS 116, the GPS 118, the remote user interface 120, and the control system 122.

In some examples, the interface 108 can take the form of one or more wireline interfaces, such as Ethernet (e.g., Fast Ethernet, Gigabit Ethernet, and so on). The interface 108 can also support communication over one or more non-Ethernet media, such as coaxial cables or power lines, or over wide-area media, such as Synchronous Optical Networking (SONET) or digital subscriber line (DSL) technologies. The interface 108 can additionally take the form of one or more wireless interfaces, such as IEEE 802.11 (Wifi), BLUETOOTH®, or a wide-area wireless interface. However, other forms of physical layer interfaces and other types of standard or proprietary communication protocols can be used over the interface 108. Furthermore, the interface 108 can comprise multiple physical interfaces. For instance, some embodiments of the computing system 102 can include Ethernet and Wifi interfaces.

The system 100 includes the first sensor 112 and the second sensor 114, which represent sensors configured to capture sensor data for processing by the computing system 102. The first sensor 112 and the second sensor 114 can be various types of sensors, such as cameras, radar, LIDAR, electro-optical sensors, or a combination of different sensors. For instance, the first sensor 112 and the second sensor 114 are a pair of high resolution cameras in some examples. Further, although the system 100 is shown only with the first sensor 112 and the second sensor 114, other implementations can include more or fewer sensors. For instance, another example system can include two or more sensors coupled to each wing of the aircraft. In a further example, the system 100 may use a single sensor (e.g., the first sensor 112) to determine subsequent control instructions for navigating the aircraft.

The first sensor 112 and the second sensor 114 are shown physically separate from the computing system 102 and communicating with the computing system 102 via wireless communication 124. In other examples, the first sensor 112, the second sensor 114, as well as other sensors can be coupled to the computing system 102 via wired connections in other examples. As such, the sensor data obtained by the first sensor 112 and the second sensor 114 and other sensors operating within the system 100 can be used to detect objects positioned around the aircraft, including other aircrafts, people, buildings, and airport markings, such as signs and various surface lines.

The first sensor 112, the second sensor 114, as well as other sensors of the system 100 can be coupled to the aircraft at fixed locations. At the fixed locations, the sensors can have fixed orientations that prevent or limit movement during ground navigation and flight of the aircraft. As a result, the first sensor 112 and the second sensor 114 can obtain sensor data from particular perspectives and provide the sensor data to the computing system 102 for processing with limited noise occurring from lack of stability of the sensors. The computing system 102 processing the sensor data obtained by the first sensor 112 and the second sensor 114 can use the fixed positions of the sensors when determining positions of objects and surfaces lines in the environment relative to the aircraft. In some examples, the computing system 102 may use sensor data from the first sensor 112 to determine control instructions and further use sensor data from the second sensor 114 to confirm or modify the control instructions.

The particular area or areas measured by the first sensor 112 and the second sensor 114 can include one or more portions of the aircraft. In particular, the computing system 102 can use one or more portions of the aircraft as reference points when comparing the position of the aircraft relative to a target path (e.g., a centerline of a runway) or objects detected nearby the aircraft. For instance, the one or more portions of the aircraft located in the area measured by the sensors can include the nose and/or the front wheel of the aircraft, either of which could be used as a reference point for determining navigation instructions for the aircraft.

When the system 100 includes multiple sensors, the computing system 102 can receive sensor data from multiple sensors represent the environment during the same time frame. For instance, the computing system 102 can receive images from both the first sensor 112 and the second sensor 114 that were captured at the same time. The computing system 102 can process the incoming sensor data in various ways. For example, the computing system 102 can use static image pre-processing to crop and shift the perspective using incoming images received from the first sensor 112 and the second sensor 114.

Further, the computing system 102 can also use dynamic image pre-processing that involves processing received images for real-time conditions. Dynamic image pre-processing can involve correcting exposure of one or both sensors as well as performing image stabilization. The computing system 102 can also use other image processing techniques, such as least-squares fit, Maximum a posteriori (MAP) estimation, robust estimation, expectation-maximization (EM) process, and/or Fast Library for Approximate Nearest Neighbors (FLANN).

In some examples, the computing system 102 can use the front wheel or a portion of the front wheel as the reference point when comparing sensor data from both the first sensor 112 and the second sensor 114 to determine an orientation and position of the aircraft relative to a desired path of ground navigation (e.g., a centerline of a runway). For instance, the first sensor 112 and the second sensor 114 can be cameras that are configured to capture and provide images that include the front wheel and other front portions of the aircraft. The images captured and provided by the cameras can include the portions of the aircraft along with the environment of the aircraft. The sensors can capture sensor data of various portions of the aircraft when the aircraft is positioned in various areas. In further examples, the computing system can use multiple reference points on the aircraft when analyzing sensor data representing measurements of the environment of the aircraft.

The computing system 102 can be configured to use the locations of each sensor when performing sensor data processing techniques to detect objects, airport markings, people, and other aspects of the environment of the environment. For example, the computing system 102 can receive images from the first sensor 112 and the second sensor 114 and use the locations of the sensors, previously known distances to the one or more reference points (e.g., a reference point on the aircraft), and pixels within each image to estimate heights and positions of objects relative to the aircraft. Radar or LIDAR can capture sensor measurements that can indicate positions of objects relative to reference points on the aircraft in some examples. In some examples, the computing system 102 is configured to fuse sensor data together from multiple sensors when determining control instructions for the aircraft.

In additional examples, the first sensor 112 and the second sensor 114 are coupled to the aircraft on mechanisms that enable modification of the orientation and/or position of each sensor. In such a configuration, the first sensor 112 and the second sensor 114 can change orientation and obtain sensor data from different areas of the environment with respect to the aircraft. For example, the first sensor 112 can rotate to capture sensor data at different perspectives relative to the aircraft.

The computing system 102 can use sensor data received from the first sensor 112, the second sensor 114, and/or other sensors to formulate instructions that can assist with ground navigation of the aircraft. As the aircraft operates, the computing system 102 can receive one or more sets of sensor data that consists of sensor data from one or both of the first sensor 112 and the second sensor 114 and use sets of sensor data to analyze the environment of the aircraft.

Analyzing the environment of the aircraft can include performing a general object detection to prevent collisions as well as to detect and identify airport markings that can assist with forming a navigation strategy. In particular, an airport or similar environment typically includes various airport markings, such as surface lines, signs, and other markings situated to assist pilots during ground navigation. The computing system 102 can use detected airport markings (e.g., surface lines, boundaries) in a manner similar to waypoints to determine a ground path for navigating the aircraft. The ground path can involve identifying and locating a desired runway and the corresponding centerline of the runway. For example, the desired runway can correspond to a path of travel that the aircraft is prepared to use for takeoff or ground navigation towards a building for unloading passengers.

The computing system 102 can also use sensor data from one or both of the first sensor 112 and the second sensor 114 to determine a lateral displacement that represents a distance between a reference point of the aircraft and the target path (e.g., a centerline of the runway). For example, the computing system 102 could compare a first position of a reference point of the aircraft relative to a centerline of the runway (or other desired path) as represented in sensor data from the first sensor with a second position of the same reference point relative to the centerline of the runway as represented in sensor data from the second sensor with the second position. When performing the comparison, the computing system 102 could use information indicating the positions of the sensors and known distances for measurements to the reference point of the aircraft, among other considerations. The computing system 102 can also use sensor data from one or both of the first sensor 112 and the second sensor 114 to determine the heading of the aircraft relative to a centerline of a target path (e.g., the centerline of a runway).

The computing system 102 can further use sensor data from other sensors when determining control instructions for the aircraft, such as the AHRS 116 and the GPS 118. The AHRS 116 is a sensor positioned on the aircraft that can provide trend information to the computing system 102. In particular, the AHRS 116 can measure trend information consisting of past movements and orientations of the aircraft using solid-state or microelectromechanical systems (MEMS) gyroscopes, accelerometers, and magnetometers. The trend information can reflect recent prior movements of the aircraft as the aircraft navigates a runway and other paths at an airport or similar environment. For instance, the trend information can indicate the orientation and position of the aircraft during the last few meters, hundreds of meters, or another amount of ground navigation. In some examples, the AHRS 116 consists of sensors on three axes that can provide attitude information for the aircraft, including roll, pitch and yaw.

The GPS 118 is a satellite-based radio navigation system configured to also provide trend information to the computing system 102. Using measurements from GPS satellites, the receiver of the GPS 118 can determine a position of the aircraft and changes in the position as the aircraft navigates. The computing system 102 can receive trend information from the AHRS 116 and/or the GPS 118. The computing system 102 can also receive trend information regarding recent movements and orientations of the aircraft from other types of sensors, such as an inertial measurement unit (IMU) or standalone accelerometers, gyroscopes, or magnetometers.

During ground navigation of the aircraft, the computing system 102 can receive trend information that represents one or more prior movements performed by the aircraft from one or both of the AHRS 116 and the GPS 118. The computing system 102 can further use the trend information to estimate a future position and orientation of the aircraft. The future position and orientation of the aircraft can then be used by the computing system 102 to determine a lateral displacement that represents a distance between a reference point of the aircraft (e.g., nose of the aircraft) and the centerline of the runway. In some instances, the future position and orientation of the aircraft is based on the current speed and acceleration of the aircraft as well as other possible factors (e.g., the slope of the ground and the speed of the wind in the environment).

In some examples, the computing system 102 is configured to detect noise in sensor data received from the first sensor 112 and the second sensor 114. Particularly, the computing system 102 can receive sets of sensor data during navigation of the aircraft. The sets of sensor data can include sensor data from one or both of the first sensor 112 and the second sensor 114. As such, in some cases, the computing system 102 can detect noise in sensor data that can interfere with determining the lateral displacement of the aircraft relative to the centerline of the runway. Similarly, the computing system 102 can also detect system failure (e.g., a sensor drops out) in some sets of sensor data using other sensors or additional sets of sensor data.

In response to detecting the noise in the sensor data, the computing system 102 can use the future position and orientation of the aircraft estimated using trend information from one or both of the AHRS 116 and the GPS 118 to determine the lateral displacement that represents the distance between a reference point of the aircraft and the centerline of the runway. For example, the computing system 102 can determine that the aircraft was previously aligned with a target path prior to detecting noise within sensor data received from one or both of the first sensor 112 and the second sensor 114. As such, the computing system 102 can use the trend information to determine that no further adjustments are required in the near future since the aircraft was already aligned with the target path. In some examples, the trend information obtained by one or both of the AHRS 116 and the GPS 118 can supplement sensor data received from the first sensor 112 and the second sensor 114.

In some examples, the computing system 102 is configured to detect gaps in surface lines measured within sensor data obtained by the first sensor 112, the second sensor 114, and other sensors coupled to the aircraft. For example, when the aircraft is navigating according to a centerline of a runway or another path, the computing system can be configured to detect gaps in the centerline of the runway using sensor data received from the first sensor 112 and the second sensor 114. The gaps can arise due to dirt or other debris blocking the visibility of the surface line or can be part of the overall configuration of the surface line (i.e., the surface line is intended to include gaps).

When one or more gaps in a target path are detected, the computing system 102 can be configured to use trend information to assist with maintaining the centralized position of the aircraft on the runway or other path of travel. As such, in response to detecting the gap in the centerline of the runway, the computing system 102 can use the future position and orientation of the aircraft estimated using trend information from one or both of the AHRS 116 and the GPS 118 to determine the lateral displacement that represents the distance between a reference point of the aircraft and the target path (e.g., the centerline of the runway).

FIG. 1 further shows the computing system 102 communicating with the remote user interface 120. The remote user interface 120 can be any type of device, including a smartphone, a remote control system, a table computer, or a wearable computing device, among others. As such, the remote user interface 120 is configured to display information received from the computing system 102, such as control instructions developed and provided by the computing system 102. For example, the remote user interface 120 can display one or more adjustments provided by the computing system 102 for modifying the path of the aircraft to cause the aircraft to align with a target path. In further examples, the remote user interface 120 can also enable a user to remotely control the aircraft during ground navigation.

In some examples, the remote user interface 120 includes a head-mountable display. For example, the head-mountable display can display the adjustments to enable a user to provide input in response via an interface associated with the head-mountable display.

The control system 122 represents a system that can control navigation components of the aircraft. In some examples, the control system 122 can be located inside the aircraft to enable an on-board pilot to use sensor data and/or instructions provided by the computing system 102. The control system 122 can be part of a general control system that a pilot uses to navigate the aircraft. For example, the control system 122 can cause a steering system, braking system, lighting system, and/or other systems of the aircraft to execute control instructions received from the system 100.

In some examples, the control system 122 can be a system that can autonomously navigate the aircraft using control instructions provided by the computing system 102. For example, the control system 122 can cause systems of the aircraft to perform the control instructions received from the computing system 102. The control system 122 and the computing system 102 can be part of the same computing device. In another example, the control system 122 is positioned remotely from the aircraft. For instance, the control system 122 can have a location that enables the control system 122 to remotely control the aircraft.

FIG. 2 illustrates the system coupled to an aircraft, according to an example implementation. The system 100 is shown with the first sensor 112 and the second sensor 114 coupled to the aircraft 202 while other components of the system 100 (e.g., the system 102, the AHRS 116, and the GPS 118) are not shown. In other examples, the system 100 can be coupled to another type of vehicle, such as a four-wheel vehicle or another type of aircraft.

The aircraft 202 is a two-winged plane that includes a propeller coupled to the nose 208 of the aircraft 202. In other examples, the aircraft 202 can have another configuration, such as a jet or larger passenger plane configuration. The aircraft 202 is shown with the first sensor 112 coupled at a first location on the first wing 204 and the second sensor 114 coupled at a second location on a second wing 206. The locations of the sensors can differ within other examples. For instance, one or more sensors can be coupled to the body of the aircraft 202.

The nose 208 of the aircraft 202 is shown with a propeller configured to transmit power by converting rotational motion into thrust. When determining a lateral displacement or general orientation of the aircraft 202 relative to a desired path in the environment (e.g., the centerline of a runway), the computing system 102 can be configured to use the nose 208 of the aircraft 202 as a reference point. For instance, the computing system 102 can use sensor data to determine the lateral displacement of the nose 208 relative to a centerline of a runway upon which the aircraft 202 is navigating.

The front wheel 210 of the aircraft 202 can be also be used as a reference point for determining the position and orientation of the aircraft during ground navigation. In addition to the front wheel 210, the aircraft 202 is further shown including a pair of back wheels 212 configured to enable ground navigation of the aircraft 202.

The cockpit 214 is an area of the aircraft 202 that can house one or more pilots during operation of the aircraft 202. In some examples, the cockpit 214 can include the computing system 102, the control system 122, and other components of the system. In other examples, the computing system 102, the control system 122, and/or other components of the system 100 can be positioned remotely from the aircraft 202.

FIG. 3 illustrates a front view of the system coupled to the aircraft, according to an example implementation. The front view shows the system 100 coupled to the aircraft 202, including the first sensor 112 coupled to the first wing 204 and the second sensor 114 coupled to the second wing 206. In other examples, the system 100 is coupled to the aircraft 202 in other configurations, including more or fewer sensors coupled at other locations on the aircraft 202.

Figure 4:
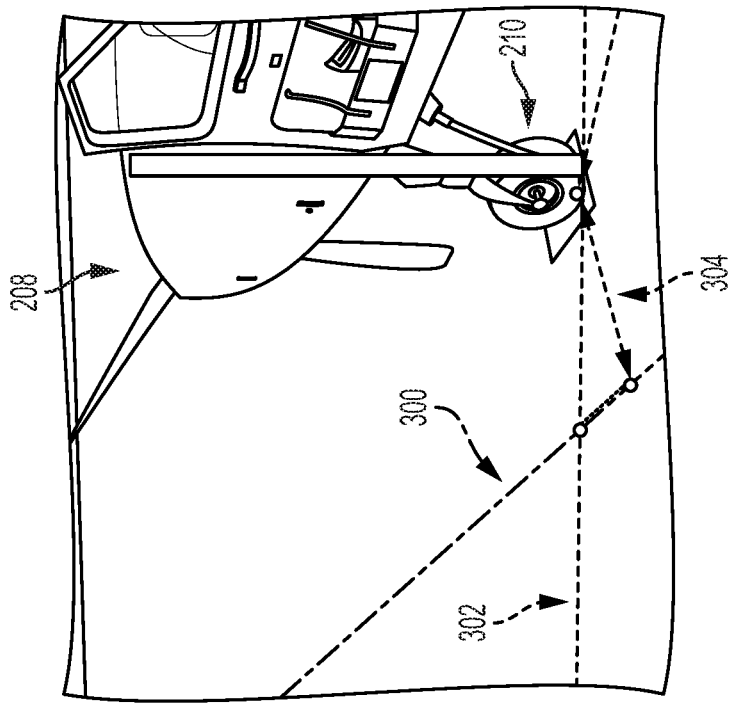
FIG. 4 illustrates a first perspective of a reference point of an aircraft that corresponds to a first sensor coupled to the aircraft, according to an example implementation.

FIG. 4 illustrates a first perspective of a reference point of an aircraft that corresponds to a first sensor coupled to the aircraft, according to an example implementation. The image shown in FIG. 4 represents an example image that the first sensor 112 coupled to the first wing 204 of the aircraft 202 can capture and provide to the computing system 102. In other examples, the first perspective shown in the image can differ depending on the location and orientation of the first sensor 112 relative to the aircraft 202. Further, other examples can involve another type of sensor capturing sensor data representing an area of the environment of the aircraft 202.

The image represents an area of the forward environment of the aircraft 202 that includes a portion of a target path 300 and the nose 208 and the front wheel 210 of the aircraft. The target path 300 represents a path that the system 100 can be configured to assist the aircraft 202 travel upon. For example, the computing system 102 can use sensor data, such as the image shown in FIG. 4 to determine control instructions to align the aircraft 202 with the target path 300 along during subsequent ground navigation. As such, as the aircraft 202 navigates, the computing system 102 can use additional images or other sensor data to detect and monitor changes in the lateral displacement between the aircraft 202 and the target path 300. In further examples, the system 100 can estimate a center of a path and attempt to cause the aircraft 202 to navigate along the estimated center of the path.

As indicated above, the computing system 102 can use the image shown in FIG. 4 to determine a lateral displacement 304 between the target path 300 and a reference point of the aircraft (i.e., the bottom of the front wheel 210). In some examples, the computing system 102 can align the image with a map to further determine a path for navigating the aircraft 202.

Figure 5:
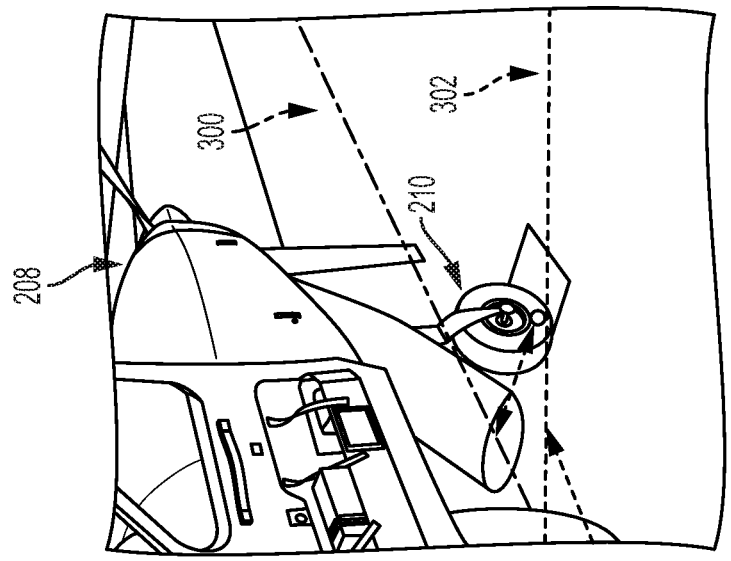
FIG. 5 illustrates a second perspective of the reference point of the aircraft that corresponds to a second sensor coupled to the aircraft, according to an example implementation.

FIG. 5 illustrates a second perspective of the reference point of the aircraft that corresponds to a second sensor coupled to the aircraft, according to an example implementation. The image shown in FIG. 5 represents an example image that the second sensor 114 coupled to the second wing 206 of the aircraft 202 can capture and provide to the computing system 102. In other examples, the second perspective shown in the image can differ depending on the location and orientation of the second sensor 114 relative to the aircraft 202. Further, other examples can involve another type of sensor capturing sensor data representing an area of the environment of the aircraft 202.

The image shown in FIG. 5 represents an area that includes the target path 300 and the nose 208 and the front wheel 210 of the aircraft 202. The computing system 102 can use the images shown in FIGS. 4 and 5 to determine the lateral displacement 304 of a bottom portion of the front wheel 210 relative to the target path 300. Particularly, the computing system 102 can use a combination of images received from the first sensor 112 and the second sensor 114 to estimate the lateral displacement 304 representing a distance between a bottom portion of the front wheel 210 and the target path 300.

In some examples, the computing system 102 can determine the lateral displacement 304 by initially localizing the target path 300 using a filter (e.g., Sobel Filter, sliding window) within images or sensor data received from one or both of the first sensor 112 and the second sensor 114. The computing system 102 can then project a horizontal line 302 from a reference point on the aircraft 202 (e.g., the bottom portion of the front wheel 210) to the through the target path 300 in order to identify an intersection between the horizontal line 302 and the target path 300. After identifying the intersection, the computing system 102 can solve to find the pixel or pixels in the images that correspond to the intersection. The computing system 102 can then project the pixel of the intersection along the target path 300 and use a dot product to find the difference in distance between the projection and the intersection. At this point, the computing system 102 can determine the lateral displacement 304.

Figure 6:
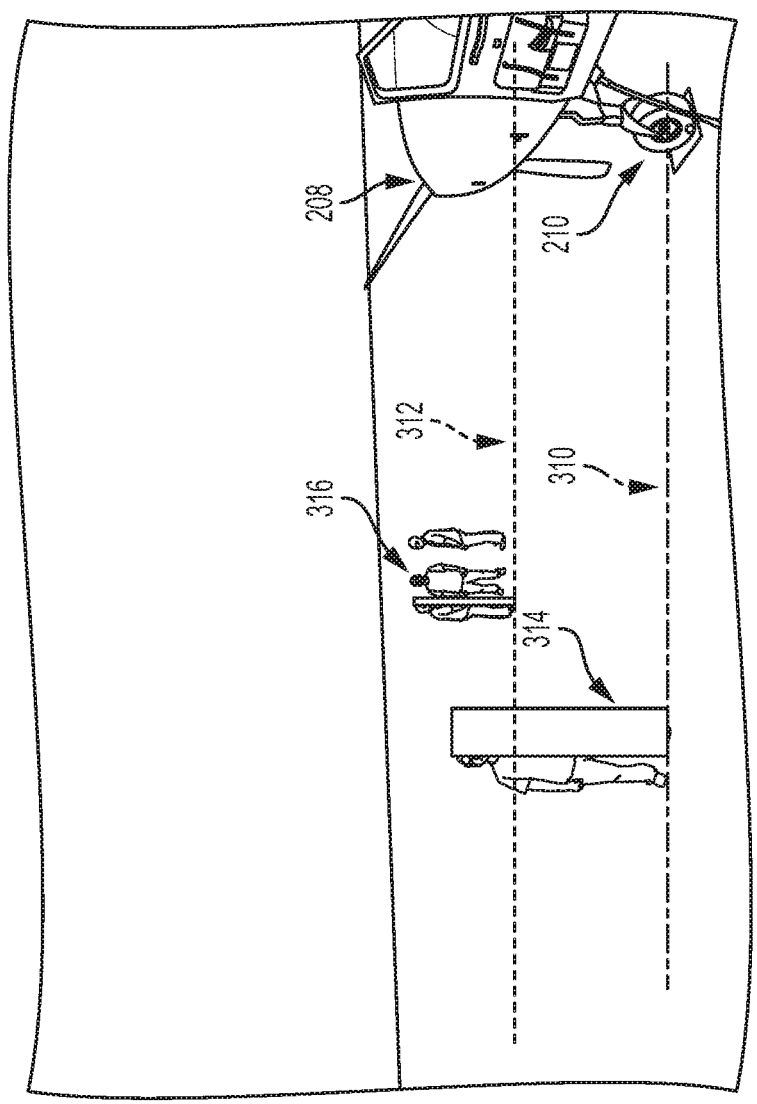
FIG. 6 illustrates a reference distance analysis using the first sensor coupled to the aircraft, according to an example implementation.

FIG. 6 illustrates a reference distance analysis using the first sensor coupled to the aircraft, according to an example implementation. When using sensor data received from the first sensor 112 (i.e., images), the computing system 102 can perform computer vision processing techniques to estimate distances of objects in the environment. The computer vision processing can involve using the location of the first sensor 112 on the aircraft 202 and known distances between portions of the aircraft compared within measurements from the first sensor 112. In some examples, the computing system 102 can combine information from images received from both the first sensor 112 and the second sensor 114 to estimate positions of objects, surface lines, people, and other features in the environment of the aircraft 202.

As shown in FIG. 6, the computing system 102 can determine the height and position of people or objects in the environment of the aircraft 202. For example, the computing system 102 can project a first line 310 that extends horizontally across the image along the same plane of the front wheel 210. The first line 310 can be used to give an indication of heights of objects or people positioned along the first line 310. Particularly, the computing system 102 can estimate that a person represented by block 314 positioned on the first line 310 is approximately six feet tall based on the number of pixels that the person extends upward in the image.

Similar to determining the height of people or objects positioned on the first line 310, the computing system 102 can also determine the height of people and objects positioned farther from the aircraft 202. The computing system 102 can project a second line 312 that can be extended and used to estimate the heights of people and objects positioned at the second line 312. The projection of the second line 312 involves using the fixed position of the first sensor 112 and prior pixel measurements to estimate the height of objects and people that are situated along the second line 312. As shown in FIG. 6, the computing system 102 can estimate the height of the person standing along the second line 312 (i.e., estimated height of 6 feet) based on the person having a height that corresponds to 100 pixels upward. The computing system 102 can perform similar projections using either the first sensor 112 or the second sensor 114 to determine distances and heights of objects, people, and airport markings relative to the aircraft 202. In addition, the computing system 102 can also estimate the distances of the objects relative to the aircraft 202.

Figure 7:
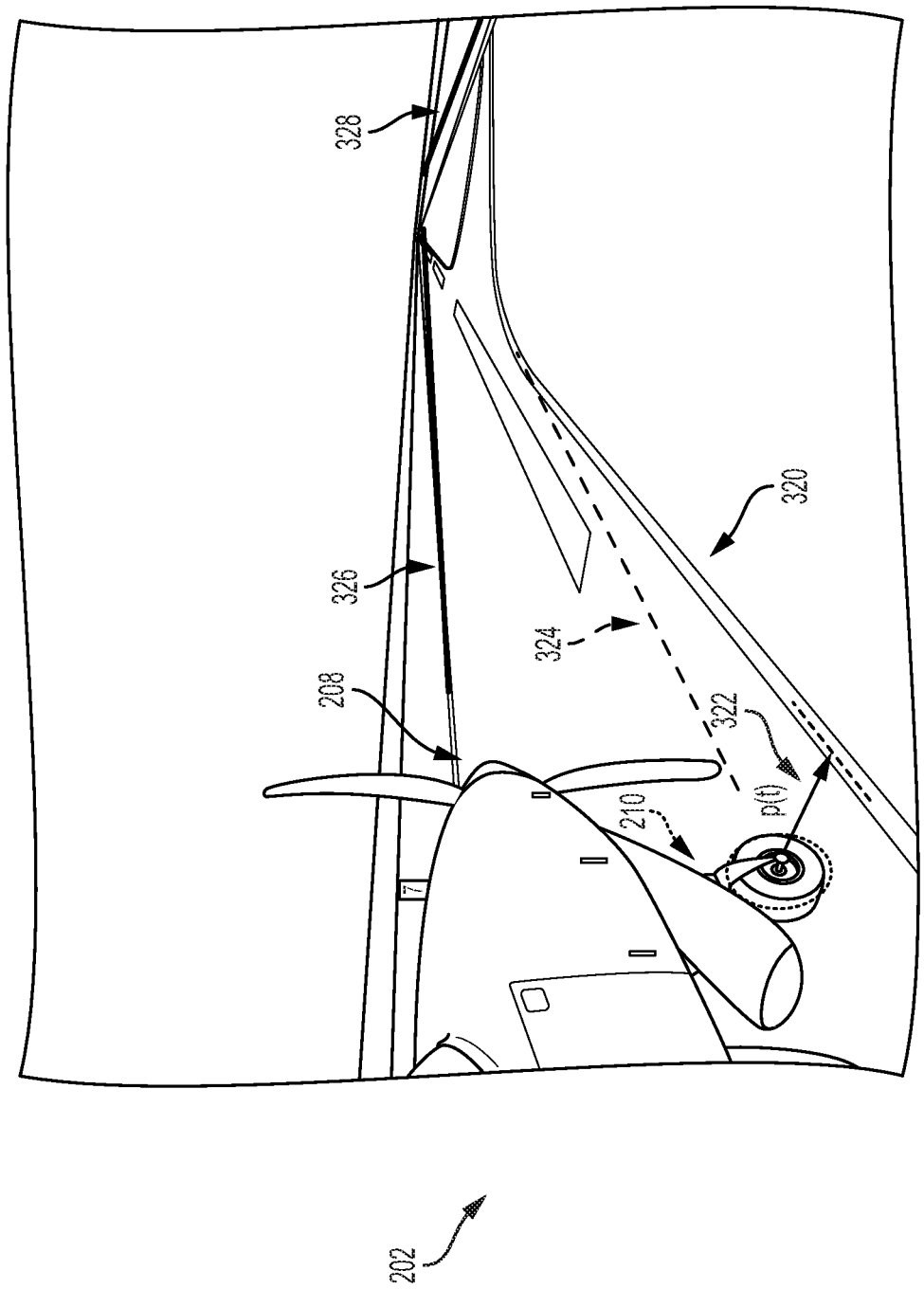
FIG. 7 illustrates determining a lateral displacement between a reference point of the aircraft and a centerline of a runway, according to an example implementation.

FIG. 7 illustrates determining a lateral displacement between a reference point of the aircraft and a centerline of a runway, according to an example implementation. As shown in FIG. 7, the computing system 102 can use sensor measurements from one or more sensors (e.g., the first sensor 112 and the second sensor 114) coupled to the aircraft 202 to determine the lateral displacement 322 representing the distance between the front wheel 210 of the aircraft and the centerline 320 of the runway that the aircraft 202 is navigating.

As discussed above, the system 100 can perform operations to assist the aircraft 202 navigate the ground environment at an airport or similar environment. In particular, the computing system 102 within the system 100 can receive and use sensor data to detect airport markings in the nearby environment, such as a left boundary 326 and a right boundary 328 extending along the runway. The computing system 102 can further use the detected airport markings, including the left boundary 326 and the right boundary 328 to detect and identify the centerline 320 of the runway.

After detecting and identifying the centerline 320 of the runway (or another target path), the computing system 102 can use subsequent sensor data to determine the lateral displacement 322 that exists between the front wheel 210 and the centerline 320 of the runway. The computing system 102 can further determine control instructions that indicate adjustments to the controls of the aircraft 202 that would align the front wheel 210 with the centerline 320 of the runway. For example, the control instructions could cause the aircraft 202 to follow the adjustment path 324 until the front wheel 210 of the aircraft 202 is aligned with the centerline 320 of the runway.

Figure 8:
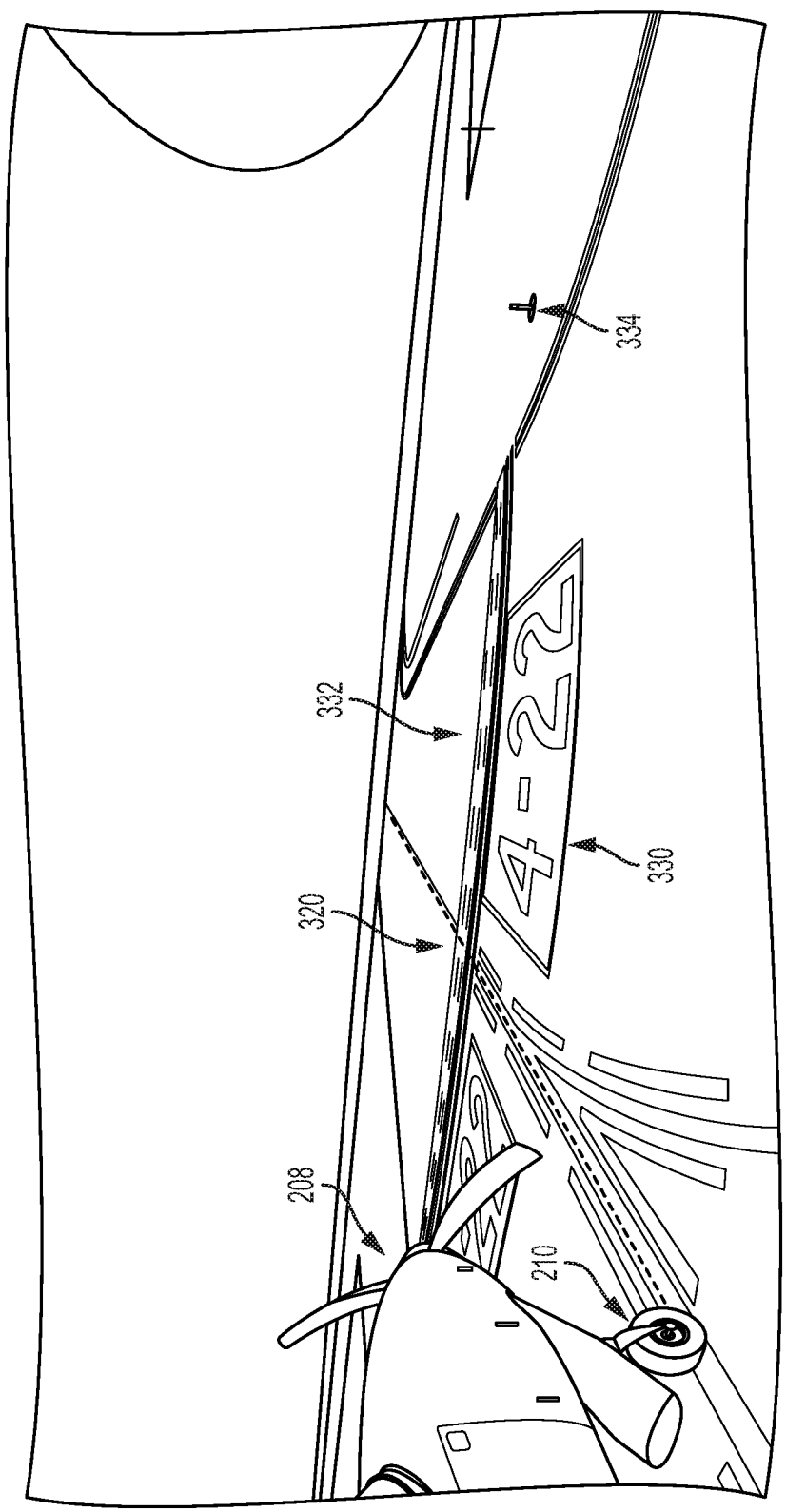
FIG. 8 illustrates detection of airport markings positioned proximate a runway using a set of sensor data, according to an example implementation.

FIG. 8 illustrates detection of airport markings positioned proximate a runway using a set of sensor data, according to an example implementation. As shown in FIG. 8, the system 100 can further use sensor data to detect airport markings, such as sign 330, sign 332, and sign 334. The computing system 102 can further use detection of the signs 330-334 to determine navigation strategies for the aircraft. For example, the computing system 102 can use airport markings (e.g., sign 330) to identify the runway for the aircraft 202 to navigate upon. Similarly, the computing system 102 can use the sign 332 to determine that the aircraft 202 should temporarily stop until further sensor data confirms that the runway is free for the aircraft 202 to use.

Figure 9:
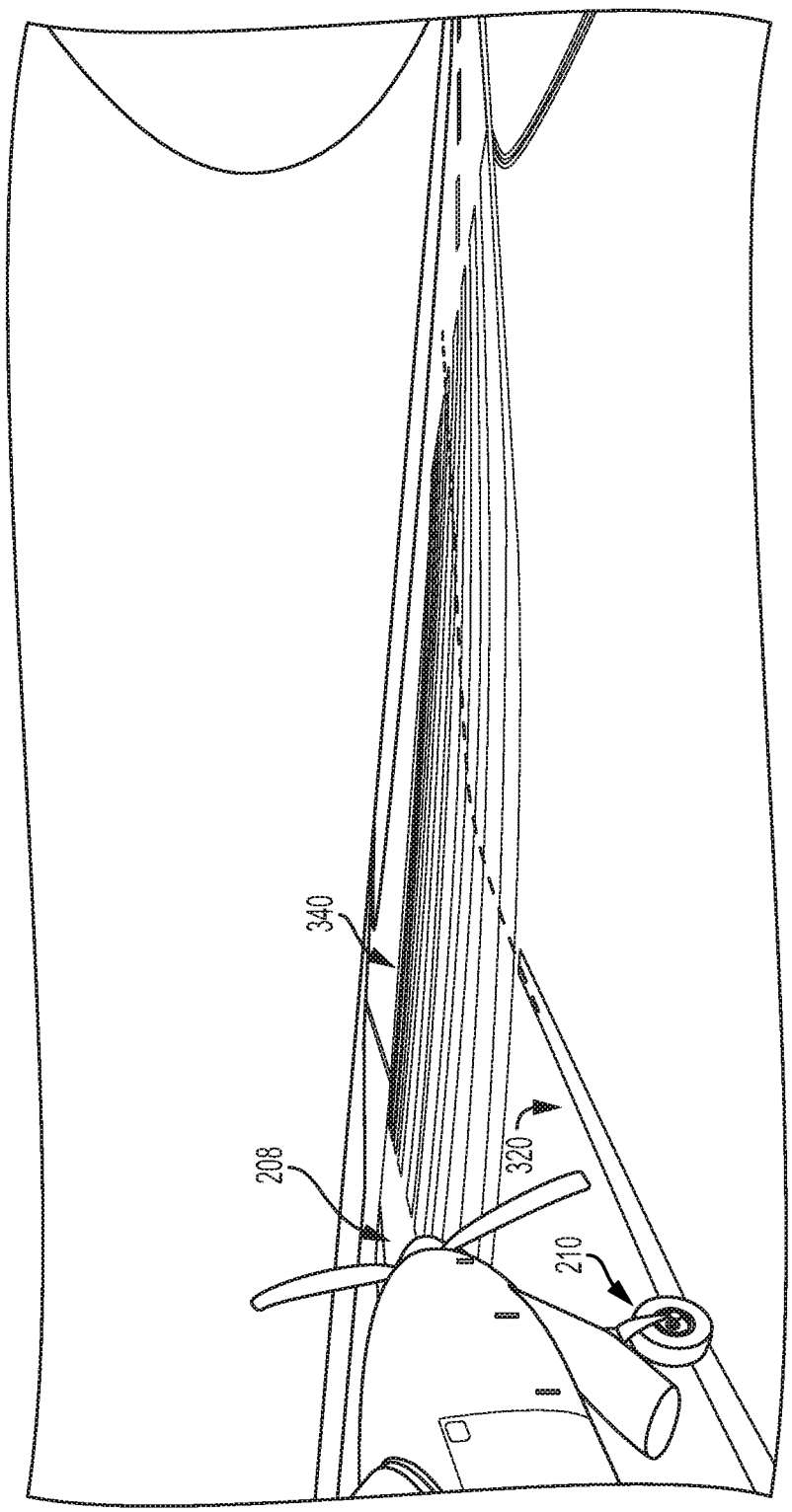
FIG. 9 illustrates identification of an intersection of the runway, according to an example implementation.

FIG. 9 illustrates identification of an intersection of the runway, according to an example implementation. During ground navigation of the aircraft 202, the aircraft 202 can encounter different intersections at the airport or similar environment. An intersection, such as the intersection 340 shown in FIG. 9, can correspond to the point at which multiple ground paths overlap. To enable safe navigation of the aircraft 202, the system 100 can be configured to detect and identify intersections (e.g., intersection 340) using sensor data.

Upon detection of the intersection 340, the computing system 102 can be configured to determine control instructions. For instance, the computing system 102 can determine a change in the path of the aircraft 202 in response to detecting the intersection 340. Similarly, the computing system 102 can identify a runway for the aircraft 202 to use during subsequent navigation.

Figure 10:
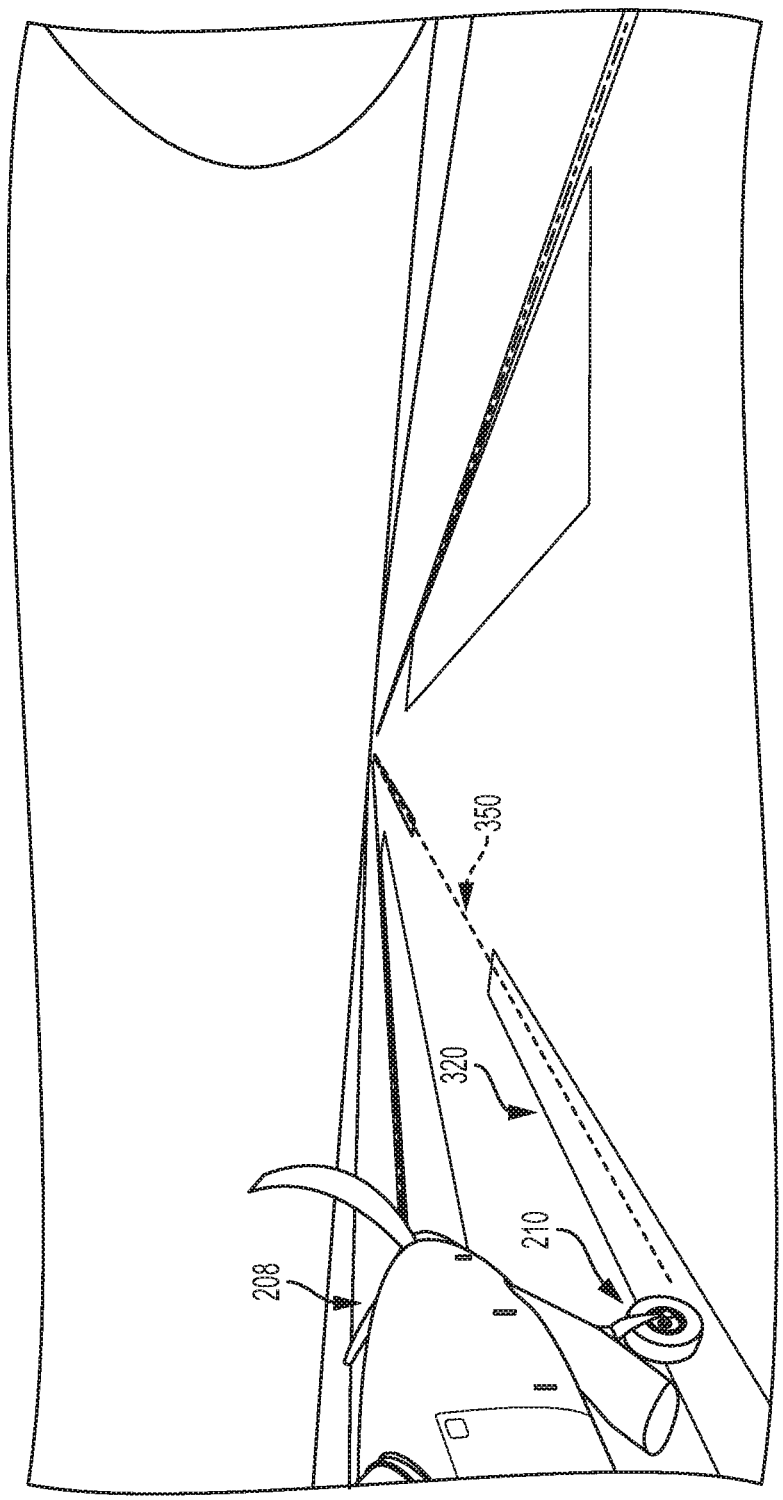
FIG. 10 illustrates detection of a gap in the centerline of the runway, according to an example implementation.

FIG. 10 illustrates detection of a gap in the centerline of the runway, according to an example implementation. As the aircraft 202 navigates, the computing system 102 can monitor the path of travel of the aircraft 202 (e.g., the front wheel 210 of the aircraft 202) relative to one or more surface markings (e.g., the centerline 320 of the runway), boundaries, and other features in the environment. In some cases, the centerline 320 or another surface marking used by the computing system 102 can include one or more gaps (e.g., gap 350).

After detecting the gap 350 in the centerline 320 of the runway, the computing system 102 can be configured to use the trend information received from one or both of the AHRS 116 and GPS 118 to determine the lateral displacement that represents the distance between the reference point of the aircraft 202 and the centerline 320 of the runway. In particular, the trend information can be used to estimate a future position and orientation of the aircraft 202 enabling the computing system 102 to determine the lateral displacement despite the gap in the centerline 320. In addition, the computing system 102 can use the additional surface markings 352, 354 when determining the lateral displacement of the front wheel 210 relative to the centerline 320.

Figure 11:
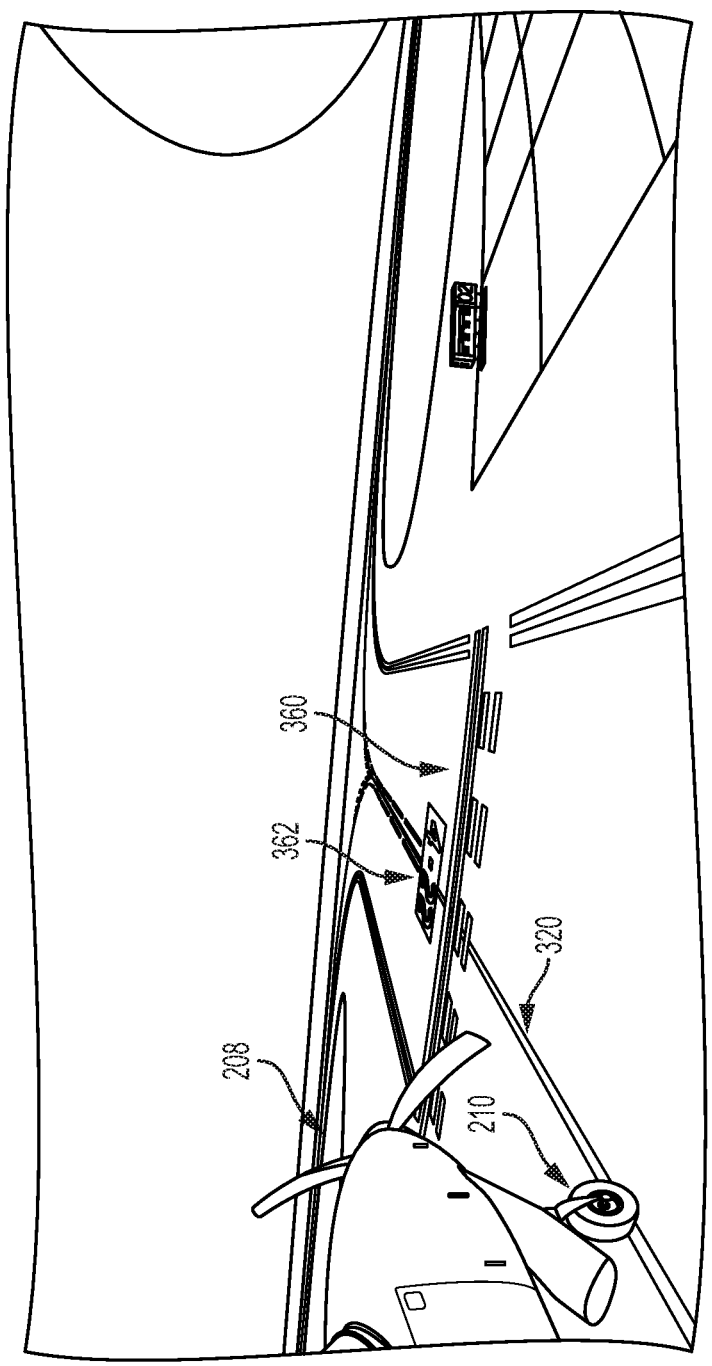
FIG. 11 illustrates identification of a boundary of the runway based on airport markings, according to an example implementation.

FIG. 11 illustrates identification of a boundary of the runway based on airport markings, according to an example implementation. The system 100 can further detect airport markings 360, 362 that represent an end of the runway upon which the aircraft 202 is currently traveling. As a result of detecting the airport markings 360, 362 within sensor data, the computing system 102 can determine control instructions for subsequent ground navigation of the aircraft 202.

As an example, the system 100 can detect the airport markings 360, 362 while slowing down on the runway after completing a landing. In response to detecting the airport markings 360, 362 indicative of the ending of the runway, the computing system 102 can further determine control instructions that aim to navigate the aircraft 202 according to the turns in the runway. In particular, execution of the control instructions can cause the aircraft 202 to continue to align with and follow the centerline 320 through turns in the runway.

Figure 12:
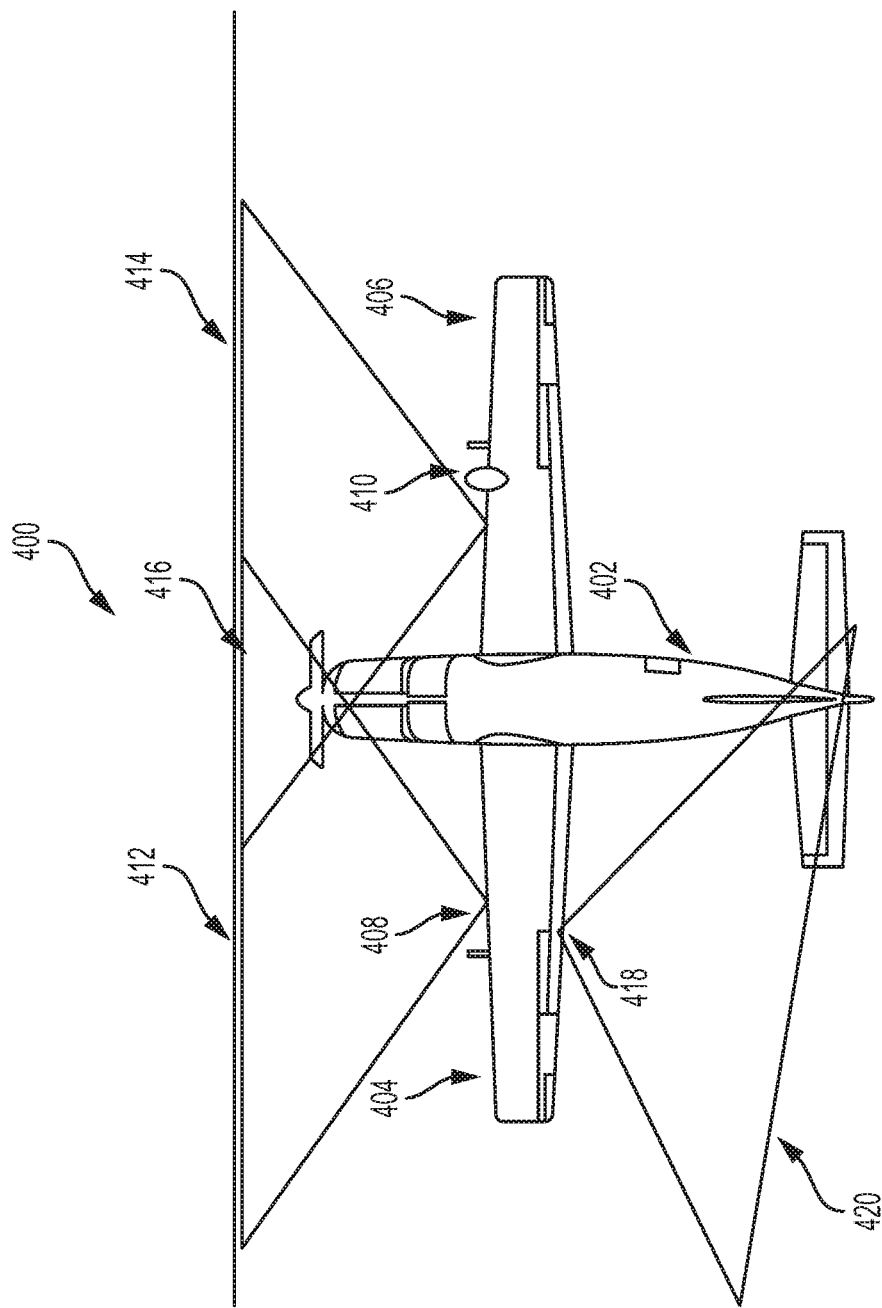
FIG. 12 illustrates sensor locations on an aircraft, according to an example implementation.

FIG. 12 illustrates sensor locations on an aircraft, according to an example implementation. The system 400 represents another example system configured to perform operations related to autonomous runway navigation. Similar to the system 100 depicted in FIG. 1, the system 400 can be used to assist in ground navigation of an aircraft, including providing control instructions that can enable semi-autonomous or fully autonomous operation of the aircraft 402.

As shown in FIG. 12, the system 400 includes a first sensor 408, a second sensor 410, and a third sensor 418, but can include additional sensors positioned at other locations on the aircraft 402 in other implementations. As such, the system 400 can use sensor measurements from the various sensors to estimate a vehicle state within the general context of the airport and to further assist with ground navigation.

The aircraft 402 is shown as a monoplane configured with a first wing 404 and a second wing 406, but can have other configurations within examples. The first sensor 408 is shown coupled at a first location on the first wing 404 and the second sensor 410 is shown coupled at a second location on the second wing 406. At the first location and the second location, the first sensor 408 and the second sensor 410 are both configured to measure a forward environment of the aircraft 402 with the first sensor 408 measuring a first area 412 of the forward environment of the aircraft 402 and the second sensor 410 measuring a second area 414 of the forward environment of the aircraft 402. The first area 412 and the second area 414 both include a portion of the aircraft 402 (i.e., the nose of the aircraft 402) as represented in the overlapping zone 416. The overlapping zone 416 corresponds to an area that both the first sensor 408 and the second sensor 410 can measure.

In addition to measuring the forward environment of the aircraft 402, the system 400 further includes a third sensor 418 coupled at a third location on the first wing 404. At the third location, the third sensor 418 is positioned and oriented to measure a backward environment of the aircraft 402 represented by third area 420. A computing system of the system 400 can use sensor data from the third sensor 418 and other similarly positioned sensors measuring the backward environment of the aircraft 402 when determining reverse navigation instructions and to gain a better understanding of the environment of the aircraft 402 overall. In further examples, the aircraft 402 can include additional sensors positioned at other locations, such as a sensor positioned on the back of the second wing 406 in a manner similar to the third sensor 418.

Figure 13:
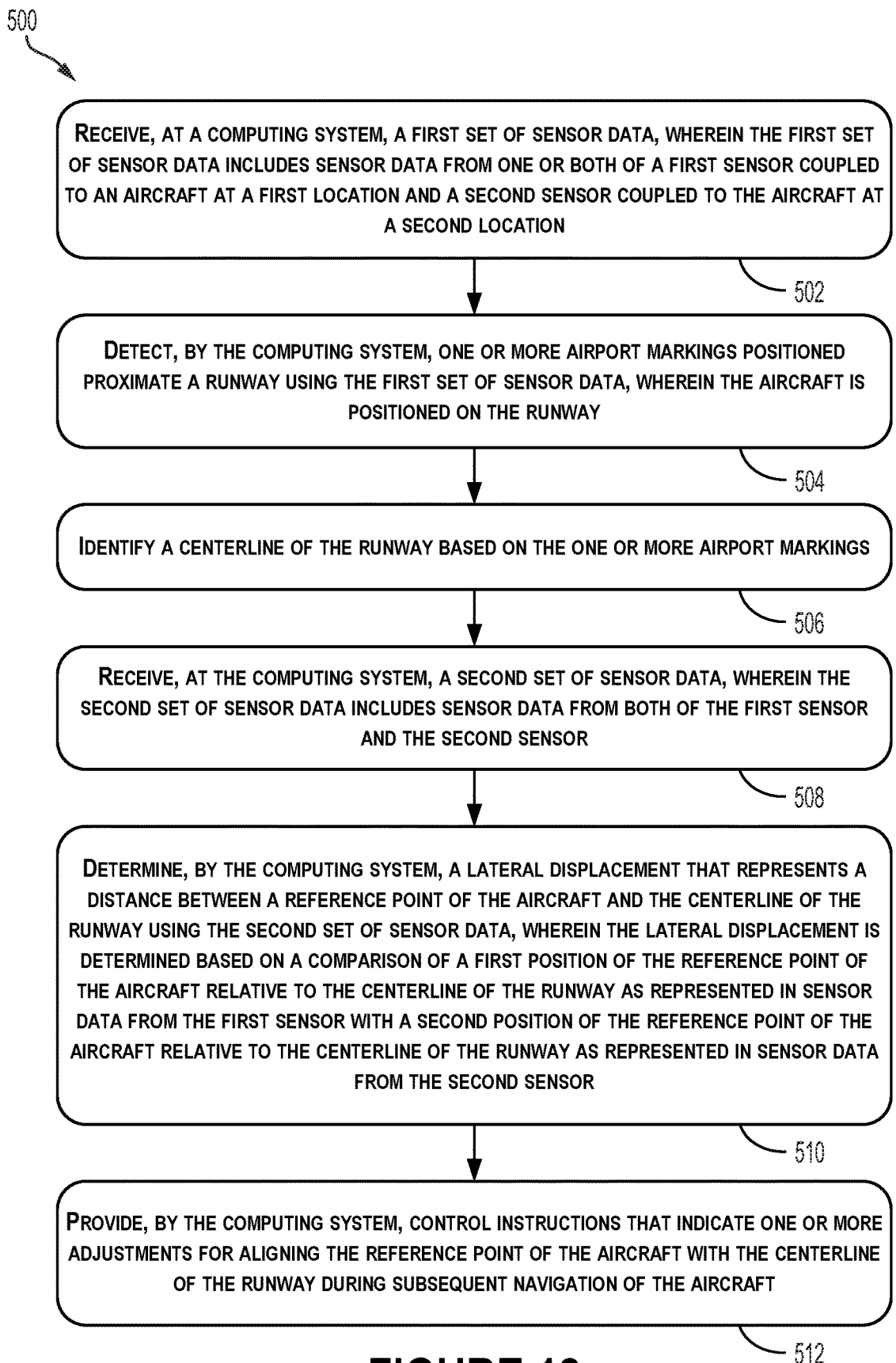
FIG. 13 shows a flowchart of a method, according to an example implementation.

FIG. 13 shows a flowchart of a method, according to an example implementation. Method 500 shown in FIG. 13 presents an example of a method that could be used with the system 100 shown in FIGS. 1-12. In other examples, components of the devices and/or systems may be arranged to be adapted to, capable of, or suited for performing the functions, such as when operated in a specific manner.

Method 500 may include one or more operations, functions, or actions as illustrated by one or more of blocks 502, 504, 506, 508, 510, and 512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 502, the method 500 involves receiving, at a computing system, a first set of sensor data, wherein the first set of sensor data includes sensor data from one or both of a first sensor coupled to an aircraft at a first location and a second sensor coupled to the aircraft at a second location. The computing system can receive the first set of sensor data from one or more sensors coupled to the aircraft, including from different types of sensors positioned at various locations on the aircraft. For example, the computing system can receive sensor data from one or more electro-optical sensors and/or one or more cameras (e.g., thermal imaging cameras, RGB cameras).

In an example, the computing system receives images or another type of sensor data from cameras coupled to the wings of the aircraft. For instance, a first camera could have a position on a first wing of the aircraft such that the first camera captures images of an area that includes a reference point of the aircraft (e.g., the nose or the front wheel of the aircraft) and corresponding runway positioned below the reference point of the aircraft at a first perspective. Similarly, a second camera could have a similar position on a second wing of the aircraft such that the second camera captures images of the area that includes the reference point of the aircraft and corresponding runway or other type of path positioned below the reference point of the aircraft at a second perspective. In another example, the computing system can receive sensor data from a single sensor coupled to a body or another part of the aircraft.

At block 504, the method 500 involves detecting, by the computing system, one or more airport markings positioned proximate a runway using the first set of sensor data, wherein the aircraft is positioned on the runway. In particular, the computing system can use sensor data to detect signs, surface lines, objects, people, aircrafts, and other features in the environment of the aircraft. Similar to a pilot, the computing system can use the detected airport markings to gain a further understanding of the environment of the aircraft in order to develop navigation instructions. In some examples, the computing system can use sensor data to detect boundaries of a target path. For instance, the computing system can use sensor data to detect runway edge geometry to define bounds of the runway.

At block 506, the method 500 involves identifying a centerline of the runway based on the one or more airport markings. The computing system can use the detected surface lines, signs, and other airport markings to determine a runway or another ground path for the aircraft to use for ground navigation.

In some examples, the computing system uses the airport markings to identify a centerline of a runway. For instance, the computing system can use detected boundaries extending along the sides of the runway to further identify the centerline of the runway. Similarly, the computing system can use signs, other surface lines and markings to identify the centerline of the runway.

At block 508, the method 500 involves receiving, at the computing system, a second set of sensor data, wherein the second set of sensor data includes sensor data from both of the first sensor and the second sensor. The second set of sensor data represents subsequent sensor data obtained by the first sensor, the second sensor, and/or other sensors coupled to the aircraft. In some examples, the computing system can receive subsequent sensor data from a single sensor coupled to the aircraft.

The computing system can receive additional sets of sensor data from various sensors coupled to the aircraft, such as the first sensor and the second sensor. The computing system can receive sensor data continuously or in periodic sets. Further, the computing system can also receive different types of sensor data, such as images and radar measurements.

At block 510, the method 500 involves determining, by the computing system, a lateral displacement that represents a distance between a reference point of the aircraft and the centerline of the runway using the second set of sensor data.

In some examples, the lateral displacement is determined based on a comparison of a first position of the reference point of the aircraft relative to the centerline of the runway as represented in sensor data from the first sensor with a second position of the reference point of the aircraft relative to the centerline of the runway as represented in sensor data from the second sensor. The computing system can also determine a heading of the aircraft relative to the centerline of the runway.

At block 512, the method 500 involves providing, by the computing system, control instructions that indicate one or more adjustments for aligning the reference point of the aircraft with the centerline of the runway during subsequent navigation of the aircraft.

Figure 14:
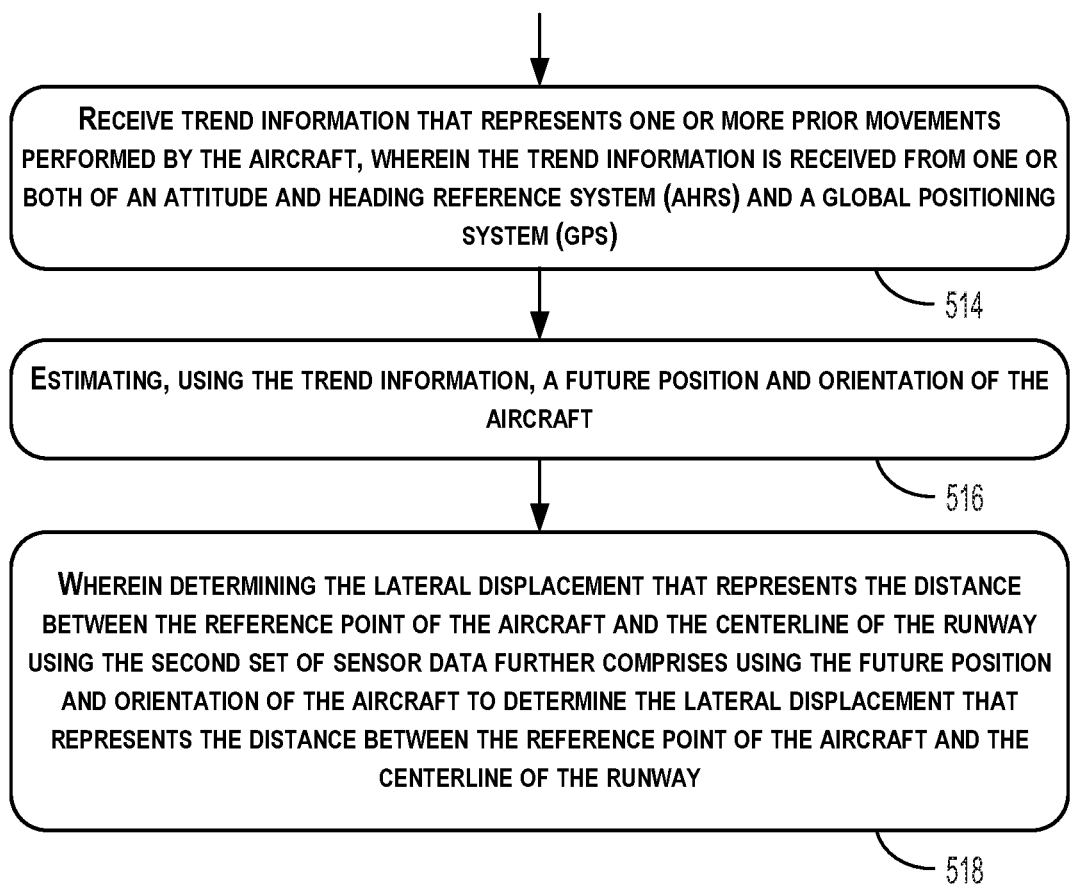
FIG. 14 shows a flowchart of another method for use with the method shown in FIG. 13, according to an example implementation.

FIG. 14 shows a flowchart of an example method for use with the method 500, according to an example embodiment. At block 514, functions include receiving trend information that represents one or more prior movements performed by the aircraft, wherein the trend information is received from one or both of an attitude and heading reference system (AHRS) and a global positioning system (GPS). The computing system can receive the trend information from one or more sensors, such as the AHRS, the GPS, or another type of sensor (e.g., an IMU).

At block 516, functions include estimating, using the trend information, a future position and orientation of the aircraft. The computing system can use the trend information to determine prior movements performed by the aircraft and further project the movements to estimate one or more future positions and orientations of the aircraft. The computing system can use the speed, orientation, acceleration, and position of the aircraft when estimating future positions.

At block 518, functions include wherein determining the lateral displacement that represents the distance between the reference point of the aircraft and the centerline of the runway using the second set of sensor data further comprises using the future position and orientation of the aircraft to determine the lateral displacement that represents the distance between the reference point of the aircraft and the centerline of the runway.

Figure 15:
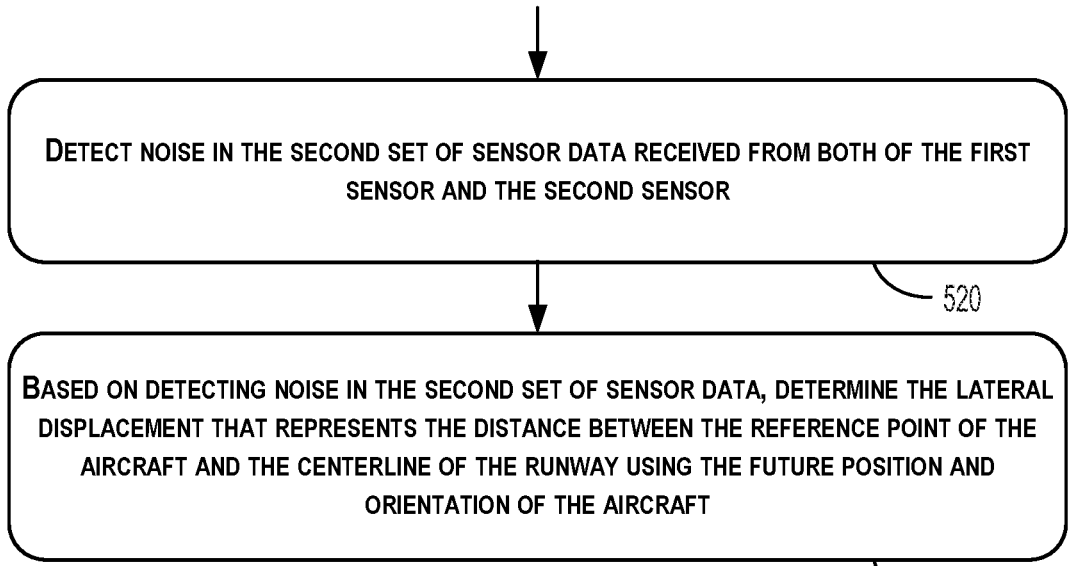
FIG. 15 shows a flowchart of another method for use with the method shown in FIG. 13, according to an example implementation.

FIG. 15 shows a flowchart of an example method for use with the method 500, according to an example embodiment. At block 520, functions include detecting noise in the second set of sensor data received from both of the first sensor and the second sensor. The computing system can detect noise based on lack of accurate measurements within a set of received sensor data. For example, the computing system can detect noise based on a set of sensor data having measurements that appear less consistent with other sensor data obtained during a similar time frame. In some examples, the computing device can detect system failure in other sets of sensor data (e.g., an individual sensor dropped out temporarily).

At block 522, functions include, based on detecting noise in the second set of sensor data, determining the lateral displacement that represents the distance between the reference point of the aircraft and the centerline of the runway using the future position and orientation of the aircraft. In particular, the trend information can provide the computing system with additional measurements that can help when determining the lateral displacement.

Figure 16:
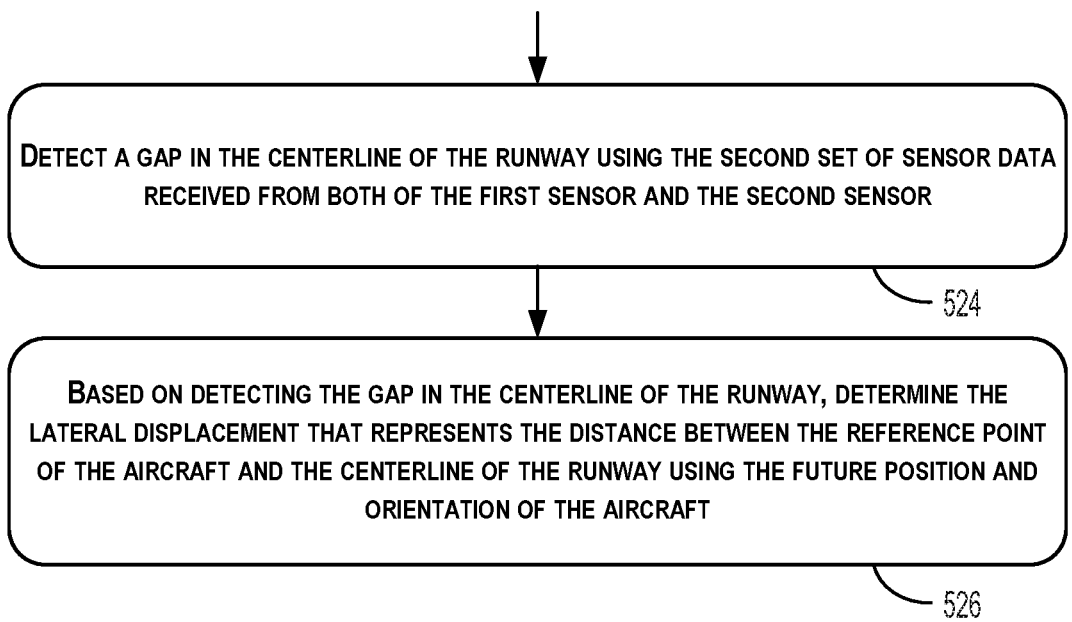
FIG. 16 shows a flowchart of another method for use with the method shown in FIG. 13, according to an example implementation.

FIG. 16 shows a flowchart of an example method for use with the method 500, according to an example embodiment. At block 524, functions include detecting a gap in the centerline of the runway using the second set of sensor data received from both of the first sensor and the second sensor. A gap can represent one or more discontinuities in the surface line marking the centerline of a runway. In some examples, gaps can arise in sensor data due to poor lighting conditions or rubbed off markings.

At block 526, functions include, based on detecting the gap in the centerline of the runway, determining the lateral displacement that represents the distance between the reference point of the aircraft and the centerline of the runway using the estimated future position and orientation of the aircraft.

Figure 17:
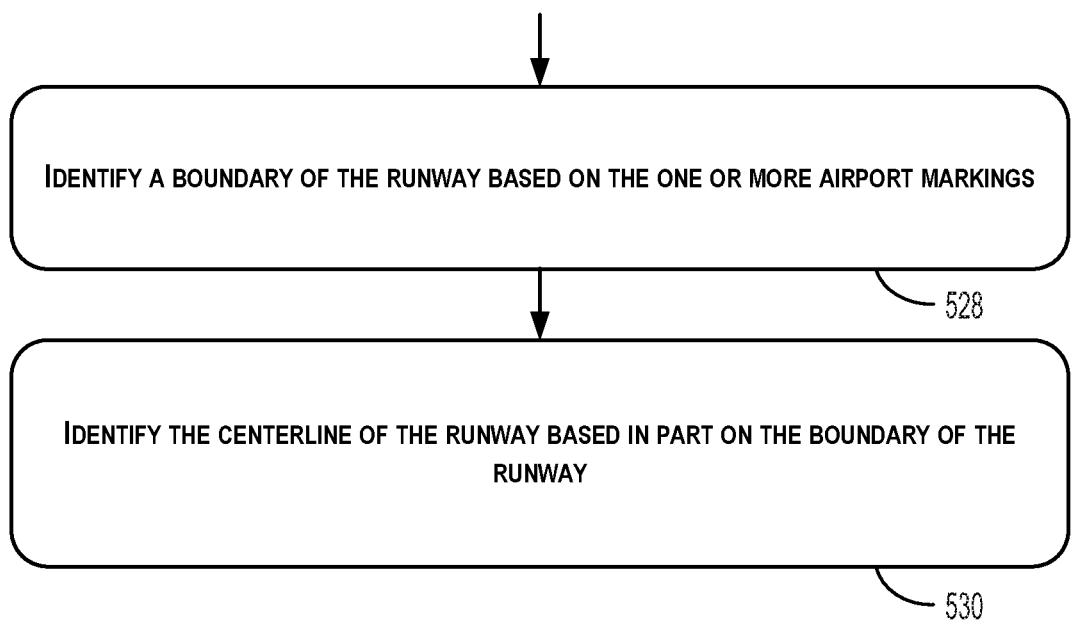
FIG. 17 shows a flowchart of another method for use with the method shown in FIG. 13, according to an example implementation.

FIG. 17 shows a flowchart of an example method for use with the method 500, according to an example embodiment. At block 528, functions include identifying a boundary of the runway based on the one or more airport markings.

At block 530, functions include identifying the centerline of the runway based in part on the boundary of the runway. In some examples, the computing system can project the centerline ahead of the aircraft on the runway based on prior detection of the centerline.

By the term "substantially" or "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system, comprising:
   a first sensor coupled to an aircraft at a first location;
   a second sensor coupled to the aircraft at a second location;
   an attitude and heading reference system (AHRS); and
   a computing system configured to:
      receive a first set of sensor data that includes sensor data from one or both of the first sensor and the second sensor;
      detect one or more airport markings positioned proximate a runway using the first set of sensor data, wherein the aircraft is positioned on the runway;
      identify a centerline of the runway based on the one or more airport markings;
      receive a second set of sensor data that includes sensor data from both of the first sensor and the second sensor and trend information from the AHRS;
      determine a lateral displacement that represents a distance between a reference point of the aircraft and the centerline of the runway using the second set of sensor data, wherein the lateral displacement is initially determined based on a comparison of a first position of the reference point relative to the centerline of the runway as represented in sensor data from the first sensor with a second position of the reference point relative to the centerline of the runway as represented in sensor data from the second sensor and refined based on a future position and orientation of the aircraft determined using the trend information; and
      provide control instructions that indicate one or more adjustments for aligning the reference point of the aircraft with the centerline of the runway during subsequent navigation of the aircraft.

2. The system of claim 1, wherein the computing system is further configured:
   detect noise in the second set of sensor data received from both of the first sensor and the second sensor; and
   responsive to detecting the noise in the second set of sensor data, use only the future position and orientation of the aircraft to determine the lateral displacement that represents the distance between the reference point of the aircraft and the centerline of the runway.

3. The system of claim 1, wherein the computing system is further configured:
   detect a gap in the centerline of the runway using the second set of sensor data received from both of the first sensor and the second sensor; and
   responsive to detecting the gap in the centerline of the runway, use only the future position and orientation of the aircraft to determine the lateral displacement that represents the distance between the reference point of the aircraft and the centerline of the runway.

4. The system of claim 1, wherein the first location is on a first wing of the aircraft such that the first sensor receives sensor data of an area that includes the reference point of the aircraft and corresponding runway positioned below the reference point of the aircraft at a first perspective, and wherein the second location is on a second wing of the aircraft such that the second sensor receives sensor data of the area that includes the reference point of the aircraft and corresponding runway positioned below the reference point of the aircraft at a second perspective.

5. The system of claim 1, wherein the first sensor and the second sensor include cameras.

6. The system of claim 1, wherein the reference point is a nose of the aircraft.

7. The system of claim 1, wherein the computing system is configured to provide the control instructions that indicate the one or more adjustments for aligning the reference point of the aircraft with the centerline of the runway during subsequent navigation of the aircraft to a remote user interface, wherein the remote user interface is configured to display the one or more adjustments and enable remote control of the aircraft.

8. The system of claim 7, wherein the remote user interface includes a head-mountable display.

9. The system of claim 1, wherein the computing system is configured to provide the control instructions that indicate the one or more adjustments for aligning the reference point of the aircraft with the centerline of the runway during subsequent navigation of the aircraft to a control system of the aircraft for autonomous operation.

10. The system of claim 1, wherein the computing system is further configured to:
    identify an intersection of the runway based on the one or more airport markings, wherein an airport marking corresponds to a surface line of the runway or a sign positioned proximate the runway; and
    wherein the computing system is configured to identify the centerline of the runway based in part on the intersection.

11. The system of claim 10, wherein the computing system is further configured to:
    identify a boundary of the runway based on the one or more airport markings; and
    wherein the computing system is configured to identify the centerline of the runway based in part on the boundary of the runway.

12. A method comprising:
    receiving, at a computing system, a first set of sensor data, wherein the first set of sensor data includes sensor data from one or both of a first sensor coupled to an aircraft at a first location and a second sensor coupled to the aircraft at a second location;
    detecting, by the computing system, one or more airport markings positioned proximate a runway using the first set of sensor data, wherein the aircraft is positioned on the runway;
    identifying a centerline of the runway based on the one or more airport markings;
    receiving, at the computing system, a second set of sensor data, wherein the second set of sensor data includes sensor data from both of the first sensor and the second sensor and trend information from an attitude and heading reference system (AHRS);
    determining, by the computing system, a lateral displacement that represents a distance between a reference point of the aircraft and the centerline of the runway using the second set of sensor data, wherein the lateral displacement is initially determined based on a comparison of a first position of the reference point of the aircraft relative to the centerline of the runway as represented in sensor data from the first sensor with a second position of the reference point of the aircraft relative to the centerline of the runway as represented in sensor data from the second sensor and refined based on a future position and orientation of the aircraft determined using the trend information; and providing, by the computing system, control instructions that indicate one or more adjustments for aligning the reference point of the aircraft with the centerline of the runway during subsequent navigation of the aircraft.

13. The method of claim 12, further comprising:
detecting noise in the second set of sensor data received from both of the first sensor and the second sensor; and
based on detecting noise in the second set of sensor data, determining the lateral displacement that represents the distance between the reference point of the aircraft and the centerline of the runway only using the future position and orientation of the aircraft.

14. The method of claim 12, further comprising:
detecting a gap in the centerline of the runway using the second set of sensor data received from both of the first sensor and the second sensor; and
based on detecting the gap in the centerline of the runway, determining the lateral displacement that represents the distance between the reference point of the aircraft and the centerline of the runway only using the future position and orientation of the aircraft.

15. The method of claim 12, wherein providing control instructions that indicate one or more adjustments for aligning the reference point of the aircraft with the centerline of the runway during subsequent navigation of the aircraft comprises:
providing the control instructions to a remote user interface, wherein the remote user interface is configured to display the one or more adjustments and enable remote control of the aircraft.

16. The method of claim 12, wherein providing control instructions that indicate one or more adjustments for aligning the reference point of the aircraft with the centerline of the runway during subsequent navigation of the aircraft comprises:
providing the control instructions to a control system of the aircraft for autonomous operation.

17. The method of claim 12, further comprising:
identifying a boundary of the runway based on the one or more airport markings; and
identifying the centerline of the runway based in part on the boundary of the runway.

18. The method of claim 12, further comprising:
determining a general location of the aircraft relative to one or more runways based on a comparison between the one or more airport markings and a map representative of an environment of the aircraft, wherein the map depicts the one or more runways in the environment;
based on the general location, determining, using the map, a ground path for navigating the aircraft to a target destination; and
selecting the runway from the one or more runways based on the ground path.

19. The method of claim 18, further comprising:
receiving a third set of sensor data;
detecting, using the third set of sensor data, an obstacle positioned proximate the runway; and
based on detecting the obstacle and the ground path, providing control instructions that cause the aircraft to circumvent the obstacle and subsequently align the reference point of the aircraft with the centerline of the runway.

20. A non-transitory computer-readable medium configured to store instructions, that when executed by a computing system, causes the computing system to perform operations comprising:
receiving a first set of sensor data, wherein the first set of sensor data includes sensor data from one or both of a first sensor coupled to an aircraft at a first location and a second sensor coupled to the aircraft at a second location;
detecting one or more airport markings positioned proximate a runway using the first set of sensor data, wherein the aircraft is positioned on the runway;
identifying a centerline of the runway based on the one or more airport markings;
receiving a second set of sensor data, wherein the second set of sensor data includes sensor data from both of the first sensor and the second sensor and trend information from an attitude and heading reference system (AHRS);
determining a lateral displacement that represents a distance between a reference point of the aircraft and the centerline of the runway using the second set of sensor data, wherein the lateral displacement is initially determined based on a comparison of a first position of the reference point of the aircraft relative to the centerline of the runway as represented in sensor data from the first sensor with a second position of the reference point of the aircraft relative to the centerline of the runway as represented in sensor data from the second sensor and refined based on a future position and orientation of the aircraft determined using the trend information; and
providing control instructions that indicate one or more adjustments for aligning the reference point of the aircraft with the centerline of the runway during subsequent navigation of the aircraft.

* * * * *